United States Patent
Nieh et al.

(10) Patent No.: US 9,477,258 B2
(45) Date of Patent: *Oct. 25, 2016

(54) CLOCK TREE IN CIRCUIT HAVING A POWER-MODE CONTROL CIRCUIT TO DETERMINE A FIRST DELAY TIME AND A SECOND DELAY TIME

(71) Applicants: Industrial Technology Research Institute, Hsinchu (TW); Chung Yuan Christian University, Taoyuan County (TW); National Tsing Hua University, Hsinchu (TW)

(72) Inventors: Yow-Tyng Nieh, Hsinchu County (TW); Shih-Hsu Huang, Hsinchu County (TW); Shih-Chieh Chang, Hsinchu (TW); Chung-Han Chou, New Taipei (TW)

(73) Assignees: Industrial Technology Research Institute, Hsinchu (TW); Chung Yuan Christian University, Chung-Li (TW); National Tsing Hua University, Hsinchu (TW)

( * ) Notice: Subject to any disclaimer, the term of this patent is extended or adjusted under 35 U.S.C. 154(b) by 70 days.

This patent is subject to a terminal disclaimer.

(21) Appl. No.: 14/509,055

(22) Filed: Oct. 8, 2014

(65) Prior Publication Data

US 2015/0026490 A1 Jan. 22, 2015

Related U.S. Application Data

(63) Continuation-in-part of application No. 14/019,546, filed on Sep. 6, 2013, now abandoned.

(30) Foreign Application Priority Data

May 22, 2013 (TW) .............................. 102118074 A
May 16, 2014 (TW) .............................. 103117373 A

(51) Int. Cl.
*G06F 1/00* (2006.01)
*G06F 1/32* (2006.01)
(Continued)

(52) U.S. Cl.
CPC ....................................... *G06F 1/10* (2013.01)

(58) Field of Classification Search
CPC ........................................................ G06F 1/3203
USPC ............................................................ 713/300
See application file for complete search history.

(56) References Cited

U.S. PATENT DOCUMENTS 6,933,754 B2  8/2005  Restle
7,023,252 B2  4/2006  Schultz
(Continued)

FOREIGN PATENT DOCUMENTS

| TW | 200925825 | 6/2009 |
| TW | 201118526 | 6/2011 |
| TW | 201225526 | 6/2012 |

OTHER PUBLICATIONS

Donno et al, Power-Aware Clock Tree Planning, Apr. 18-21, 2004, pp. 138-146.*

(Continued)

*Primary Examiner* — Suresh Suryawanshi
(74) *Attorney, Agent, or Firm* — Jianq Chyun IP Office

(57) ABSTRACT

A clock tree in a circuit and an operation method thereof are provided. The clock tree includes at least two sub clock trees, at least two voltage-controllable power-mode-aware (PMA) buffers and a power-mode control circuit. The PMA buffers delay a system clock to serve as the delayed clock, and provide respectively the delayed clock to the sub clock trees. The power-mode control circuit provides at least two first power information to at least two function modules respectively, wherein a power mode of each of the function modules is determined according to the first power information respectively. The power-mode control circuit provides at least two second power information to the PMA buffers respectively, wherein a delay time of each of the PMA buffers is determined according to the second power information respectively.

16 Claims, 9 Drawing Sheets

(51) Int. Cl.
*G06F 17/50* (2006.01)
*G06F 1/10* (2006.01)

(56) References Cited

U.S. PATENT DOCUMENTS

| | | | | |
|---|---|---|---|---|
| 7,103,862 | B2* | 9/2006 | Sung et al. | 716/103 |
| 7,164,743 | B2 | 1/2007 | Watarai | |
| 7,216,322 | B2* | 5/2007 | Lai et al. | 716/114 |
| 7,409,657 | B2* | 8/2008 | Miya | 716/103 |
| 7,471,130 | B2 | 12/2008 | Gomm et al. | |
| 8,179,178 | B2 | 5/2012 | Lundberg | |
| 8,179,181 | B2 | 5/2012 | Lung et al. | |
| 8,183,899 | B2 | 5/2012 | Kanno et al. | |
| 8,314,634 | B1 | 11/2012 | Britton et al. | |
| 8,536,920 | B2* | 9/2013 | Shen | 327/261 |
| 9,065,439 | B2* | 6/2015 | Sharma et al. | |
| 9,158,328 | B2* | 10/2015 | Park et al. | |
| 2005/0088167 | A1 | 4/2005 | Miller | |
| 2008/0116861 | A1 | 5/2008 | Kernahan et al. | |
| 2012/0169394 | A1 | 7/2012 | Hsieh et al. | |

OTHER PUBLICATIONS

Lung et al., "Clock Skew Optimization Considering Complicated Power Modes," Proceedings of the Conference & Exhibition on Design, Automation and Test in Europe(DATE), Mar. 8-12, 2010, pp. 1474-1479.

Tu et al., "Low-Power Timing Closure Methodology for Ultra-Low Voltage Designs," 2013 IEEE/ACM International Conference on Computer-Aided Design (ICCAD), Nov. 18-21, 2013, pp. 697-704.

"Office Action of Taiwan Counterpart Application", issued on Jan. 29, 2016, p. 1-p. 8.

* cited by examiner

CLOCK TREE IN CIRCUIT HAVING A POWER-MODE CONTROL CIRCUIT TO DETERMINE A FIRST DELAY TIME AND A SECOND DELAY TIME

CROSS-REFERENCE TO RELATED APPLICATION

This application is a continuation-in-part application of and claims the priority benefit of a prior application Ser. No. 14/019,546, filed on Sep. 6, 2013, now pending. The prior application Ser. No. 14/019,546 claims the priority benefit of Taiwan application serial no. 102118074, filed on May 22, 2013. This continuation-in-part application also claims the priority benefit of Taiwan application serial no. 103117373, filed on May 16, 2014. The entirety of each of the above-mentioned patent applications is hereby incorporated by reference herein and made a part of this specification.

TECHNICAL FIELD

The disclosure relates to a clock tree in a circuit and operation method of the clock tree.

BACKGROUND

In order to achieve the purpose of saving power, an integrated circuit (IC) design adopting different power modes has been used widely. FIG. 1 is a schematic diagram illustrating a clock tree (or a clock network) in a traditional integrated circuit 100. Referring to FIG. 1, the same integrated circuit (or chip) 100 may be divided into various different function modules such as a micro-processor unit (MPU) function module 110 and a digital signal processor (DSP) function module 120. In a power mode of full speed, based on operations of a control circuit inside (or outside) the integrated circuit 100, the MPU function module 110 and the DSP function module 120 are both operated at a maximum power voltage. For instance, a power voltage $V_{MPU}$ of the MPU function module 110 and a power voltage $V_{DSP}$ of the DSP function module 120 are both 1.0V. In a power mode of one certain operating condition, the power voltage $V_{MPU}$ of the MPU function module 110 is maintained at 1.0V, whereas the power voltage $V_{DSP}$ of the DSP function module 120 may be reduced (e.g., reduced to 0.4V) for saving power. In a power mode of another operating condition, the power voltage $V_{DSP}$ of the DSP function module 120 is maintained at 1.0V, whereas the power voltage $V_{MPU}$ of the MPU function module 110 may be reduced to a low voltage (e.g., reduced to 0.4V). When a power mode of idle is entered, the power voltage $V_{MPU}$ of the MPU function module 110 and the power voltage $V_{DSP}$ of the DSP function module 120 may both be reduced to 0.4V, so as to achieve the purpose of saving power.

At a clock tree synthesis (CTS) stage, a clock tree may be automatically synthesized by an electronic design automation (EDA) software. A common clock tree uses a plurality of clock buffers (e.g., clock buffers 101 to 107 depicted in FIG. 1) to gain a system clock CLK for transferring to the next clock buffer or other components. The system clock CLK may be transferred to each of the components (not illustrated) inside the integrated circuit 100 through said clock tree, and said components may be, for example, registers inside the integrated circuit 100 and/or other components under control of the system clock CLK. Ideally, the system clock CLK may simultaneously reach each of the components inside the integrated circuit 100 through the clock tree. Yet, skew factors such as transferring paths, loadings and so on may generally cause inconsistent times for the system clock CLK to reach each of the components inside the integrated circuit 100 (i.e., a clock latency), and a time difference for the system clock CLK to reach different components is known as a clock skew.

The EDA software is capable of increasing/decreasing an amount of the clock buffers for one specific operating condition to adjust delay times of the clock buffers 101 to 107, and thereby optimizing (minimizing) the clock skew. For example, in the power mode of full speed (in which the power voltages of the MPU function module 110 and the DSP function module 120 are both 1.0V), the clock latencies of the MPU function module 110 and the DSP function module 120 are 0.28 ns and 0.23 ns respectively, and thus the clock skew at the time is 0.05 ns. However, because the power voltage has a great influence on a clock delay of the clock buffer, different power modes may generate innegligible time differences for the system clock to reach each function module. Table 1 illustrates the clock skews for the MPU function module 110 and the DSP function module 120 depicted in FIG. 1 respectively under different power modes. When the power voltage $V_{DSP}$ of the DSP function module 120 is reduced from 1.0V to 0.4V, the clock latency of the DSP function module 120 is increased to 7.00 ns, such that the clock skew between the MPU function module 110 and the DSP function module 120 is correspondingly increased to 7.00−0.28=6.72 ns. When the power voltage $V_{MPU}$ of the MPU function module 110 is reduced from 1.0V to 0.4V, the clock latency of the MPU function module 110 is increased to 9.37 ns, such that the clock skew between the MPU function module 110 and the DSP function module 120 is correspondingly increased to 9.37−0.23=9.14 ns. When the power voltage $V_{MPU}$ of the MPU function module 110 and the power voltage $V_{DSP}$ of the DSP function module 120 are both reduced from 1.0V to 0.4V, the clock latency of the MPU function module 110 is increased to 9.37 ns and the clock latency of the DSP function module 120 is increased to 7.00 ns, such that the clock skew between the MPU function module 110 and the DSP function module 120 is correspondingly increased to 9.37−7.00=2.37 ns. Accordingly, the clock tree depicted in FIG. 1 cannot satisfy limitations from the clock skews for all power modes.

TABLE 1 the clock skews for the MPU function module 110 and the DSP function module 120 depicted in FIG. 1 respectively under different power modes are illustrated.

| Power Mode | MPU function module 110 | | DSP function module 120 | | Clock Skew |
|---|---|---|---|---|---|
| | Power Voltage | Clock Latency | Power Voltage | Clock Latency | |
| 1 | 1.0 V | 0.28 ns | 1.0 V | 0.23 ns | 0.05 ns |
| 2 | 1.0 V | 0.28 ns | 0.4 V | 7.00 ns | 6.72 ns |
| 3 | 0.4 V | 9.37 ns | 1.0 V | 0.23 ns | 9.14 ns |
| 4 | 0.4 V | 9.37 ns | 0.4 V | 7.00 ns | 2.37 ns |

Generally, a clock synchronization for multiple power modes design may be classified into the following methods. (1) An asynchronous design; (2) utilization of an adjustable delay buffer (ADB); and (3) utilization of a delay locked loop (DLL). In case the design adopts the asynchronous design, a handshake protocol may be developed, which increases difficulties in both system design and authentication. Moreover, additional synchronous circuits may be further required for data synchronizing. In case the adjustable delay buffer or the delay locked loop is utilized, clock signals may be returned from a plurality of ends in the clock tree for phase comparison. Therefore, additional circuit designs and placements for the adjustable delay buffer or the delay locked loop are required, which consume an innegligible cost in terms of area. Furthermore, the adjustable delay buffer or the delay locked loop also requires additional reference clocks, and a choice of the reference clocks may affect performance for the design of the clock synchronization.

SUMMARY

A clock tree in a circuit is proposed according to embodiments of the disclosure, and the clock tree includes a first clock tree, a second clock tree, at least one first channel power-mode-aware buffer (PMA buffer), at least one second channel PMA buffer and a power-mode control circuit. The first sub clock tree is disposed in a first function module of the circuit to transfer a first delayed clock to different components in the first function module. The second sub clock tree is disposed in a second function module of the circuit to transfer a second delayed clock to different components in the second function module. The at least one first channel PMA buffer is connected in series between the first sub clock tree and the system clock. The at least one first channel PMA buffer delays a system clock for a first delay time to serve as the first delayed clock for providing to the first sub clock tree. The at least one second channel PMA buffer is connected in series between the second sub clock tree and the system clock. The at least one second channel PMA buffer delays the system clock for a second delay time to serve as the second delayed clock for providing to the second sub clock tree. The power-mode control circuit is coupled to the at least one first channel PMA buffer, the at least one second channel PMA buffer, the first function module and the second function module. The power-mode control circuit determines power modes of the first function module and the second function module through at least two first power information. The power-mode control circuit provides at least two second power information to the at least one first channel PMA buffer and the at least one second channel PMA buffer to determine the first delay time and the second delay time.

An operation method of a clock tree in a circuit is proposed according to an embodiment of the disclosure. Therein, the clock tree includes at least one first channel PMA buffer, at least one second channel PMA buffer, a first sub clock tree disposed in a first function module of the circuit and a second sub clock tree disposed in a second function module of the circuit. The operation method includes: transferring a first delayed clock to different components in the first function module by the first sub clock tree; transferring a second delayed clock to different components in the second function module by the second sub clock tree; delaying a system clock for a first delay time by the at least one first channel PMA buffer to serve as the first delayed clock for providing to the first sub clock tree, wherein the at least one first channel PMA buffer is connected in series between an input terminal of the first sub clock tree and the system clock; delaying the system clock for a second delay time by the at least one second channel PMA buffer to serve as the second delayed clock for providing to the second sub clock tree, wherein the at least one second channel PMA buffer is connected in series between an input terminal of the second sub clock tree and the system clock; providing respectively at least two first power information to the first function module and the second function module to determine power modes of the first function module and the second function module respectively; and providing respectively at least two second power information to the at least one first channel PMA buffer and the at least one second channel PMA buffer to determine the first delay time and the second delay time respectively. Therein, the at least two first power information are independent from the at least two second power information.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
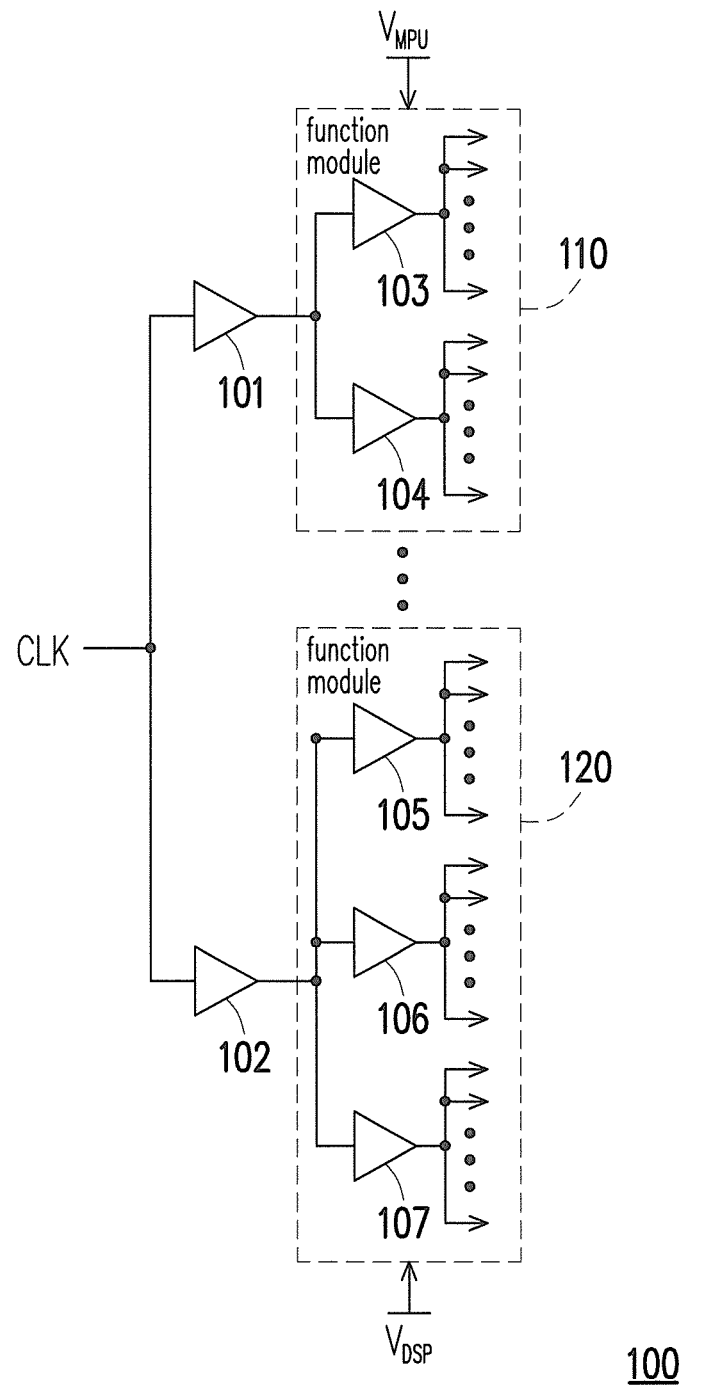
FIG. 1 illustrates a schematic diagram of a clock tree in a traditional integrated circuit.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

Figure 2:
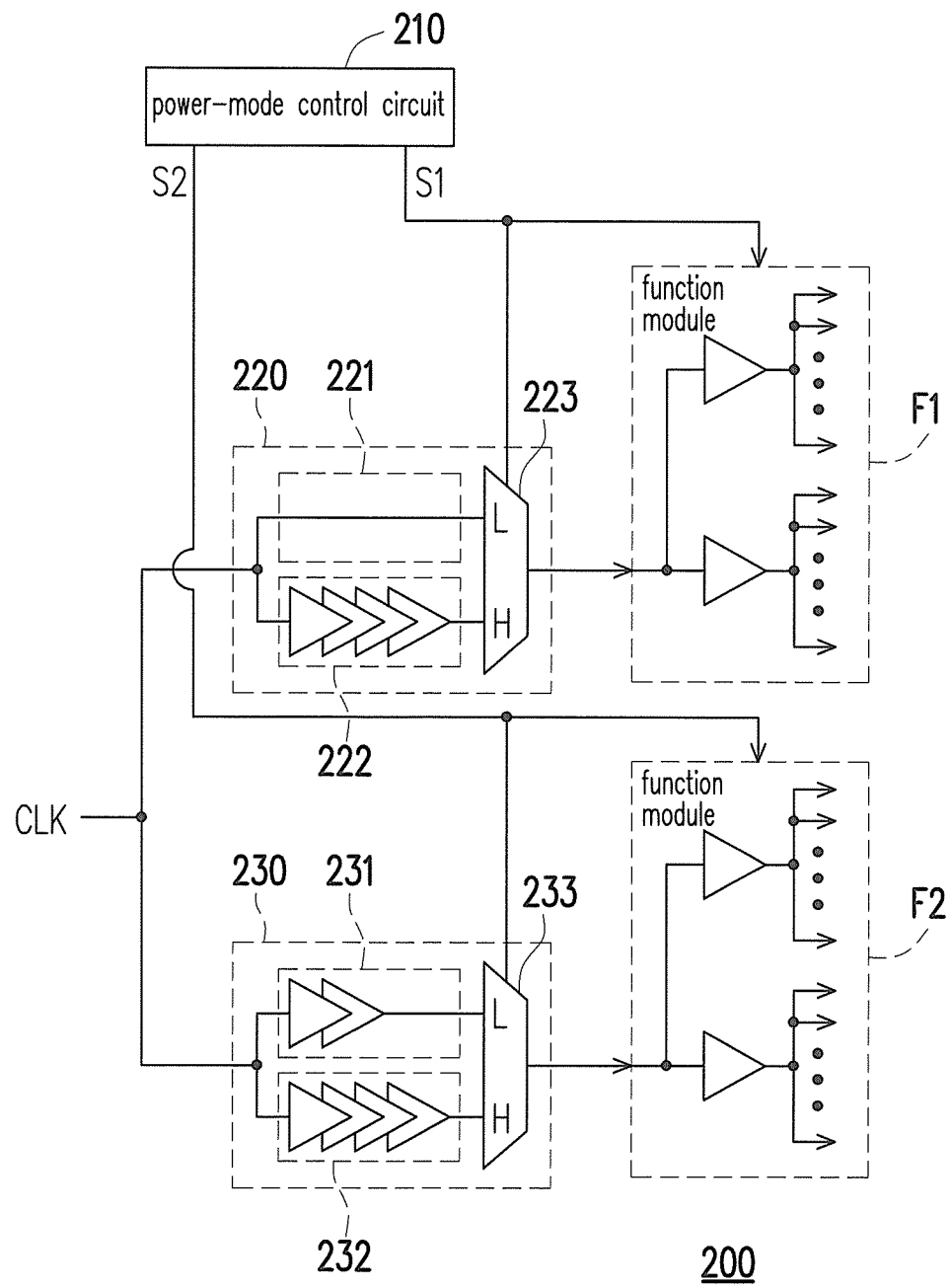
FIG. 2 is a schematic diagram illustrating circuitry of a power-mode-aware (PMA) clock tree in an integrated circuit according to an embodiment.

FIG. 2 is a schematic diagram illustrating circuitry of a power-mode-aware (PMA) clock tree in an integrated circuit 200 according to an embodiment. The integrated circuit 200 has at least two function modules. For example, FIG. 2 illustrates a first function module F1 and a second function module F2. The first function module F1 and the second function module F2 may be micro-processors, micro-controllers, digital signal processors, memories and/or communication circuits, or other function circuits. For instance, the first function module F1 may be the micro-processor unit (MPU) function module 110 depicted in FIG. 1 and the digital signal processor (DSP) function module 120 depicted in FIG. 1. It should be noted that, although FIG. 2 illustrates two function modules, the present embodiment may be applied to more of function modules by analogy according to teaching of FIG. 2.

A power-mode control circuit 210 inside (or outside) the integrated circuit 200 may provide at least two first power information to the at least two function modules respectively, so as to determine power modes of the at least two function modules respectively. For example, the power-mode control circuit 210 may change the power modes of the first function module F1 and the second function module F2 according to a power information S1 and a power information S2 respectively. The power mode (e.g., operating at 1.0V, 0.9V, 0.4V or other power voltages) of the first function module F1 may be determined according to the power information S1. The power mode (e.g., operating at 1.0V, 0.9V, 0.4V, 0V or other power voltages) of the second function module F2 may be determined according to the power information S2.

The PMA clock tree depicted in FIG. 2 includes sub clock trees disposed in the at least two function modules (e.g., F1 and F2) and at least two PMA buffers (e.g., 220 and 230) outside of the at least two function modules. At the clock tree synthesis stage, the electronic design automation (EDA) software may automatically dispose the corresponding sub clock trees in the first function module F1 and the second function module F2. The EDA software is capable of respectively adjusting a delay time of each buffer in the sub clock trees for one specific operating condition (e.g., the condition of full speed), and thereby optimizing (minimizing) the clock skew on the sub clock tree in module-level.

During process of the clock tree synthesis, the PMA buffers 220 and 230 are disposed in the integrated circuit 200, and the corresponding sub clock trees are disposed respectively in the function modules F1 and F2, as shown in FIG. 2. The PMA buffers 220 and 230 is capable of determining the delay time of the system clock CLK respectively according to the power information S1 and S2, delaying the system clock CLK to serve as a delayed clock, and then providing respectively the delayed clock to the sub clock trees of the function modules F1 and F2. The sub clock trees in the function modules F1 and F2 transfer the delayed clock to each of the components (not illustrated) inside the function module to which they belong, and said components may be, for example, registers inside the function module and/or other components under control of the system clock CLK.

For optimization of the clock trees, the present embodiment utilizes the PMA buffers 220 and 230 to improve the clock skews under different power modes. Based on the different power modes, the PMA buffers 220 and 230 may generate a clock delay corresponding to the power mode. For example, when the power modes set by the power information S1 and S2 indicate that the function modules F1 and F2 are both operated at a voltage V1, the optimization is performed on the clock delay of the clock tree to determine the delay time corresponding to the voltage V1 for the PMA buffers 220 and 230.

After the optimization of the clock delay is performed on the PMA clock tree of the embodiment depicted in FIG. 2, the PMA buffer 220 includes a delayed-channel 221, a delayed-channel 222 and a switching unit 223, and the PMA buffer 230 includes a delayed-channel 231, a delayed-channel 232 and a switching unit 233. In the present embodiment, it is assumed that the power information S1 is a power voltage for providing an operation power required by the first function module F1, and the power information S2 is a power voltage for providing an operation power required by the second function module F2.

A first selection terminal and a second selection terminal of the switching unit 223 are coupled to the delayed-channel 221 and the delayed-channel 222 respectively, and a common terminal of the switching unit 223 is coupled to an input terminal of the sub clock tree in the first function module F1. The switching unit 223 selects to electrically connect an output terminal of the delayed-channels 221 or 222 to the input terminal of the sub clock tree in the first function module F1 according to the power information S1 of the first function module F1. For example, when the power information S1 indicate that the power voltage of the first function module F1 is a high voltage H (e.g., 1.0V), the switching unit 223 electrically connects the output terminal of the delayed-channel 222 to the input terminal of the sub clock tree in the first function module F1. When the power information S1 indicate that the power voltage of the first function module F1 is a low voltage L (e.g., 0.4V), the switching unit 223 electrically connects the output terminal of the delayed-channel 221 to the input terminal of the sub clock tree in the first function module F1.

A first selection terminal and a second selection terminal of the switching unit 233 are coupled to the delayed-channel 231 and the delayed-channel 232 respectively, and a common terminal of the switching unit 233 is coupled to an input terminal of the sub clock tree in the second function module F2. The switching unit 233 selects to electrically connect an output terminal of the delayed-channels 231 or 232 to the input terminal of the sub clock tree in the second function module F2 according to the power information S2 of the second function module F2. For example, when the power information S2 indicate that the power voltage of the second function module F2 is the high voltage H (e.g., 1.0V), the switching unit 233 electrically connects the output terminal of the delayed-channel 232 to the input terminal of the sub clock tree in the second function module F2. When the power information S2 indicate that the power voltage of the second function module F2 is the low voltage H (e.g., 0.4V), the switching unit 233 electrically connects the output terminal of the delayed-channel 231 to the input terminal of the sub clock tree in the second function module F2.

In the present embodiment, it is assumed that in the delayed-channel 221, the delayed-channel 222, the delayed-channel 231 and the delayed-channel 232, a clock delay of the clock buffer used therein is 0.04 ns under the power voltage of 1.0V, and the clock delay of the clock buffer is 2.38 ns under the power voltage of 0.4V. It is also assumed that, the clock latencies of the function modules F1 and F2 under the power voltage of 1.0V are respectively 0.28 ns and 0.23 ns, and the clock latencies of the function modules F1 and F2 under the power voltage of 0.4V are respectively 9.37 ns and 7.00 ns. After the optimization of the clock delay is performed on the PMA clock tree of the embodiment depicted in FIG. 2, the delayed-channel 221 is disposed with 0 clock buffer, the delayed-channel 222 is disposed with 227 clock buffers, the delayed-channel 231 is disposed with 59 clock buffers, and the delayed-channel 232 is disposed with 228 clock buffers. Table 2 illustrates the clock skews for the function modules F1 and F2 depicted in FIG. 2 respectively under different power modes.

TABLE 2 the clock skews for the function modules F1 and F2 depicted in FIG. 2 respectively under different power modes are illustrated.

| Power Mode | Power voltage of F1 | Clock latency of F1 | Clock delay of the delayed-channel | Power voltage of F2 | Clock latency of F2 | Clock delay of the delayed-channel | Clock Skew |
|---|---|---|---|---|---|---|---|
| 1 | 1.0 V | 0.28 ns | 9.08 ns | 1.0 V | 0.23 ns | 9.12 ns | 0.01 ns |
| 2 | 1.0 V | 0.28 ns | 9.08 ns | 0.4 V | 7.00 ns | 2.36 ns | 0.00 ns |
| 3 | 0.4 V | 9.37 ns | 0 ns | 1.0 V | 0.23 ns | 9.12 ns | 0.02 ns |
| 4 | 0.4 V | 9.37 ns | 0 ns | 0.4 V | 7.00 ns | 2.36 ns | 0.01 ns |

In the power mode 1 of full speed (in which the power voltages of the function modules F1 and F2 are both 1.0V), the PMA buffers 220 and 230 may select the delayed-channels 222 and 232 respectively according to the power information S1 and S2. Accordingly, the clock latency of the function module F1 is (0.04*227)+0.28=9.08+0.28=9.36 ns, the clock latency of the function module F2 is (0.04*228)+0.23=9.12+0.23=9.35 ns, and thus the clock skew is optimized (9.36-9.35=0.01 ns).

When the power information S1 and S2 indicate that the power mode 2 is current operating, the function module F1 is operated at a maximum voltage (e.g., operated at 1.0V), and the function module F2 reduces the power voltage thereof (e.g., operated at 0.4V). In the power mode 2, the PMA buffers 220 and 230 may select the delayed-channels 222 and 231 respectively according to the power information S1 and S2. Accordingly, the clock latency of the function module F1 is (0.04*227)+0.28=9.08+0.28=9.36 ns, the clock latency of the function module F2 is (0.04*59)+7.00=2.36+7.00=9.36 ns, and thus the clock skew is optimized (9.36−9.36=0.00 ns).

When the power information S1 and S2 indicate that the power mode 3 is current operating, the function module F1 reduces the power voltage thereof (e.g., operated at 0.4V), and the function module F2 is operated at the maximum voltage (e.g., operated at 1.0V). In the power mode 3, the PMA buffers 220 and 230 may select the delayed-channels 221 and 232 respectively according to the power information S1 and S2. Accordingly, the clock latency of the function module F1 is (0.04*0)+9.37=0+9.37=9.37 ns, the clock latency of the function module F2 is (0.04*228)+0.23=9.12+0.23=9.35 ns, and thus the clock skew is optimized (9.37-9.35=0.02 ns).

When the power information S1 and S2 indicate that the power mode 4 is current operating, the function module F1 and the function module F2 both reduce their power voltages (e.g., operated at 0.4V). In the power mode 4, the PMA buffers 220 and 230 may select the delayed-channels 221 and 231 respectively according to the power information S1 and S2. Accordingly, the clock latency of the function module F1 is (0.04*0)+9.37=0+9.37=9.37 ns, the clock latency of the function module F2 is (0.04*59)+7.00=2.36+7.00=9.36 ns, and thus the clock skew is optimized (9.37−9.36=0.01 ns).

Therefore, according to a switch operation of power modes between the function module F1 and the function module F2, the PMA buffers 220 and 230 are capable of dynamically and correspondingly compensating the difference of the clock latencies between the function module F1 and the function module F2, such that overall clock skew of the clock tree can still satisfy the design specification. However, the PMA buffers 220 and 230 depicted in FIG. 2 require the clock buffers with a total of 227+59+228=514. This great amount of the clock buffers not only consumes a significant power but also occupies a large area of the chip.

Figure 3:
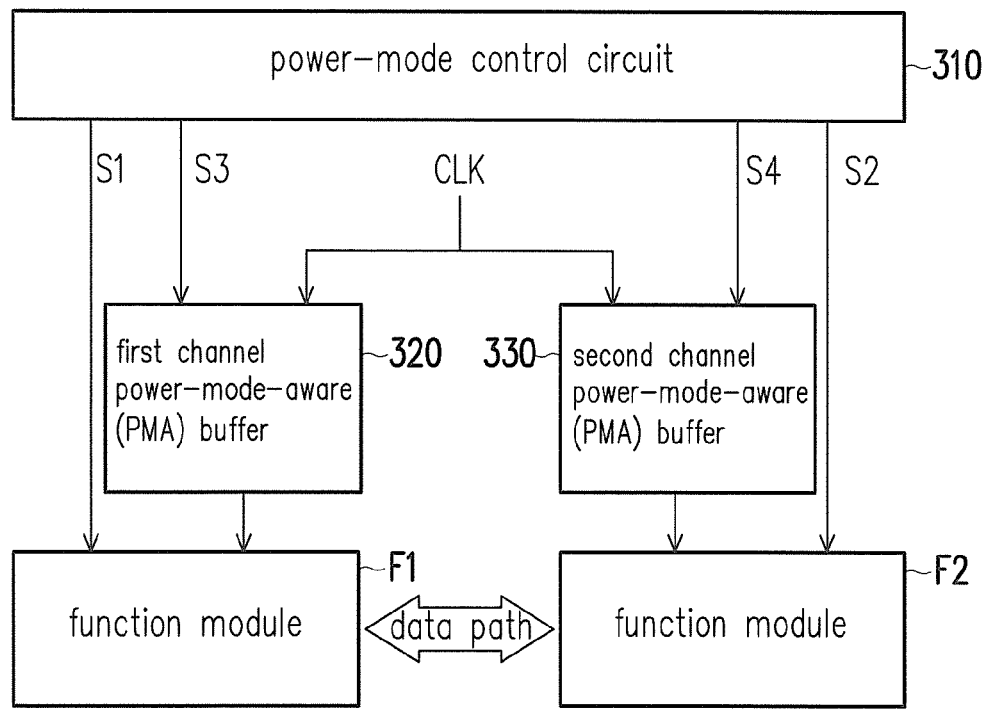
FIG. 3 is a schematic diagram illustrating circuitry of a clock tree in an integrated circuit according to an embodiment of the disclosure.

FIG. 3 is a schematic diagram illustrating circuitry of a clock tree in an integrated circuit 300 according to an embodiment of the disclosure. The embodiment depicted in FIG. 3 may be inferred by reference with related description for FIG. 2. Referring to FIG. 3, in addition to the at least two function modules (e.g., the first function module F1 and the second function module F2), the integrated circuit 300 further includes a clock tree. The clock tree includes a first clock tree, a second clock tree, at least one first channel PMA buffer 320, at least one second channel PMA buffer 330 and a power-mode control circuit 310. In the embodiment depicted in FIG. 3, the first sub clock tree is disposed in the first function module F1 to transfer a first delayed clock to different components in the first function module F1; and the second sub clock tree is disposed in the second function module F2 to transfer a second delayed clock to different components in the second function module F2. Related description for the first function module F1 and the second function module F2 depicted in FIG. 3 may be inferred by reference with the first function module F1 and the second function module F2 depicted in FIG. 2, and thus it is not repeated hereinafter. It should be noted that, although FIG. 3 illustrates two function modules F1 and F2, the present embodiment may be applied to more of function modules by analogy according to teaching of FIG. 3.

The first channel PMA buffer 320 is coupled to an input terminal of the first sub clock tree in the first function module F1, and the second channel PMA buffer 330 is coupled to an input terminal of the second sub clock tree in the second function module F2. The first channel PMA buffer 320 delays the system clock CLK for a first delay time to serve as the first delayed clock required by the first function module F1, and provides the first delayed clock to a clock input terminal of the first sub clock tree in the first function module F1. The second channel PMA buffer 330 delays the system clock CLK to serve as the second delayed clock required by the second function module F2, and provides the second delayed clock to a clock input terminal of the second sub clock tree in the second function module F2.

The power-mode control circuit 310 is coupled to the first channel PMA buffer 320, the second channel PMA buffer 330, the first function module F1 and the second function module F2. The power-mode control circuit 310 may determine the power modes of the first function module F1 and the second function module F2 according to at least two first power information (e.g., the power information S1 and the power information S2) respectively. In addition, the power-mode control circuit 310 provides respectively at least two second power information (e.g., a power information S3 and a power info nation S4) to the first channel PMA buffer 320 and the second channel PMA buffer 330, so as to determine the first delay time of the first channel PMA buffer 320 and the second delay time of the second channel PMA buffer 330. The at least two first power information (S1 and S2) are independent from the at least two second power information (S3 and S4).

The power information S1 and the power information S2 may be realized by using any methods. For instance, in some embodiments, the power information S1 and the power information S2 may be power-mode control signals. The first function module F1 determines the power voltage of the first function module F1 according to a first power-mode control signal S1, and the second function module F2 determines the power voltage of the second function module F2 according to a second power-mode control signal S2. As another example, in some other embodiments, the power information S1 and the power information S2 may be power voltages. The first power voltage S1 provides the operation power required by the first function module F1, and the second power voltage S2 provides an operation power required by the second function module F2.

The first channel PMA buffer 320 and the second channel PMA buffer 330 may be realized by using any methods. For instance, in some embodiments, the first channel PMA buffer 320 includes one single PMA buffer (hereinafter, referred to as a first PMA buffer), and the second channel PMA buffer 330 includes one single PMA buffer (hereinafter, referred to as a second PMA buffer). The first PMA buffer is coupled to the first sub clock tree in the first function module F1, and the second PMA buffer is coupled to the second sub clock tree in the second function module F2. The at least two second power information (S3 and S4) includes a first control voltage and a second control voltage. An input terminal of the first PMA buffer of the first channel PMA buffer 320 receives the system clock CLK. The first PMA buffer of the first channel PMA buffer 320 is controlled by the first control voltage S3 to delay the system clock CLK for the first delay time to serve as the first delayed clock. An output terminal of the first PMA buffer of the first channel PMA buffer 320 is coupled to the clock input terminal of the first sub clock tree in the first function module F1 to provide the first delayed clock. An input terminal of the second PMA buffer of the second channel PMA buffer 330 receives the system clock CLK. The second PMA buffer of the second channel PMA buffer 330 is controlled by the second control voltage S4 to delay the system clock CLK for the second delay time to serve as the second delayed clock. An output terminal of the second PMA buffer of the second channel PMA buffer 330 is coupled to the clock input terminal of the second sub clock tree in the second function module F2 to provide the second delayed clock.

In the present embodiment, it is assumed that in the first PMA buffer of the first channel PMA buffer 320 and the second PMA buffer of the second channel PMA buffer 330, a clock delay of the clock buffer is 0.04 ns under the power voltage of 1.0V, and the clock delay of the clock buffer is 7.91 ns under the power voltage of 0.4V. It is also assumed that, the clock latencies of the function modules F1 and F2 under the power voltage of 1.0V are respectively 0.28 ns and 0.23 ns, and the clock latencies of the function modules F1 and F2 under the power voltage of 0.4V are respectively 9.37 ns and 7.00 ns. Table 3 illustrates the clock skews for the function modules F1 and F2 depicted in FIG. 3 respectively under different power modes.

TABLE 3 the clock skews for the function modules F1 and F2 depicted in FIG. 3 respectively under different power modes are illustrated.

| Power Mode | Clock latency and power voltage of F1 | Clock delay and power voltage of the PMA buffer 320 | Clock latency and power voltage of F2 | Clock delay and power voltage of the PMA buffer 330 | Clock Skew |
|---|---|---|---|---|---|
| 1 | 0.28 ns (1.0 V) | 0.04 ns (1.0 V) | 0.23 ns (1.0 V) | 0.04 ns (1.0 V) | 0.05 ns |
| 2 | 0.28 ns (1.0 V) | 7.91 ns (0.4 V) | 7.00 ns (0.4 V) | 0.04 ns (1.0 V) | 1.15 ns |
| 3 | 9.37 ns (0.4 V) | 0.04 ns (1.0 V) | 0.23 ns (1.0 V) | 7.91 ns (0.4 V) | 1.27 ns |
| 4 | 9.37 ns (0.4 V) | 7.91 ns (0.4 V) | 7.00 ns (0.4 V) | 7.91 ns (0.4 V) | 2.37 ns |

When the first power information (S1 and S2) indicate that a power mode 1 is current operating, the power voltages of the function module F1 and the function module F2 are both the high voltage (e.g., 1.0V). In the power mode 1, the power-mode control circuit 310 controls the first channel PMA buffer 320 and the second channel PMA buffer 330 through the at least two second power information (S3 and S4), so that the power voltage of the first PMA buffer of the first channel PMA buffer 320 and the power voltage of the second PMA buffer of the second channel PMA buffer 330 may both be the high voltage (e.g., 1.0V). After the optimization of the clock delay is performed on the PMA clock tree of the embodiment depicted in FIG. 3, in the power mode of full speed (in which the power voltages of the function modules F1 and F2 are both 1.0V), the clock latencies of the function module F1 is 0.04+0.28=0.32 ns, the clock latencies of the function module F2 is 0.04+0.23=0.27 ns, and thus the clock skew is optimized (0.32−0.27=0.05 n).

When the first power information (S1 and S2) indicate that the power mode 2 is current operating, the power voltage of the first function module F1 is greater than the power voltage of the second function module F2 (e.g., the power voltage of the first function module F1 is 1.0V and the power voltage of the second function module F2 is 0.4V). In the power mode 2, the power-mode control circuit 310 controls the PMA buffers 320 and 330 respectively through the at least two second power information (S3 and S4), so that the power voltage of the first PMA buffer of the first channel PMA buffer 320 is less than the power voltage of the second PMA buffer of the second channel PMA buffer 330. For instance, the power voltage of the first PMA buffer of the first channel PMA buffer 320 may become the low voltage (e.g., 0.4V) and the power voltage of the second PMA buffer of the second channel PMA buffer 330 may become the high voltage (e.g., 1.0V). Accordingly, the clock latency of the function module F1 is 7.91+0.28=8.19 ns, the clock latency of the function module F2 is 0.04+7.00=7.04 ns, and thus the clock skew is 8.19−7.04=1.15 ns.

When the at least two first power information (S1 and S2) indicate that the power mode 3 is current operating, the power voltage of the first function module F1 is less than the power voltage of the second function module F2 (e.g., the power voltage of the first function module F1 is 0.4 V and the power voltage of the second function module F2 is 1.0 V). In the power mode 3, the power-mode control circuit 310 controls the PMA buffers 320 and 330 respectively through the at least two second power information (S3 and S4), so that the power voltage of the first PMA buffer of the first channel PMA buffer 320 is greater than the power voltage of the second PMA buffer of the second channel PMA buffer 330. For instance, the power voltage of the first PMA buffer of the first channel PMA buffer 320 may become 1.0 V and the power voltage of the second PMA buffer of the second channel PMA buffer 330 may become 0.4 V. Accordingly, the clock latency of the function module F1 is 0.04+ 9.37=9.41 ns, the clock latency of the function module F2 is 7.91+0.23=8.14 ns, and thus the clock skew is 9.41− 8.14=1.27 ns. Therefore, the PMA buffers 320 and 330 are capable of dynamically and correspondingly compensating the difference of the clock latencies between the function module F1 and the function module F2 under the different power modes, such that overall clock skew of the clock tree can satisfy the design specification.

Figure 4:
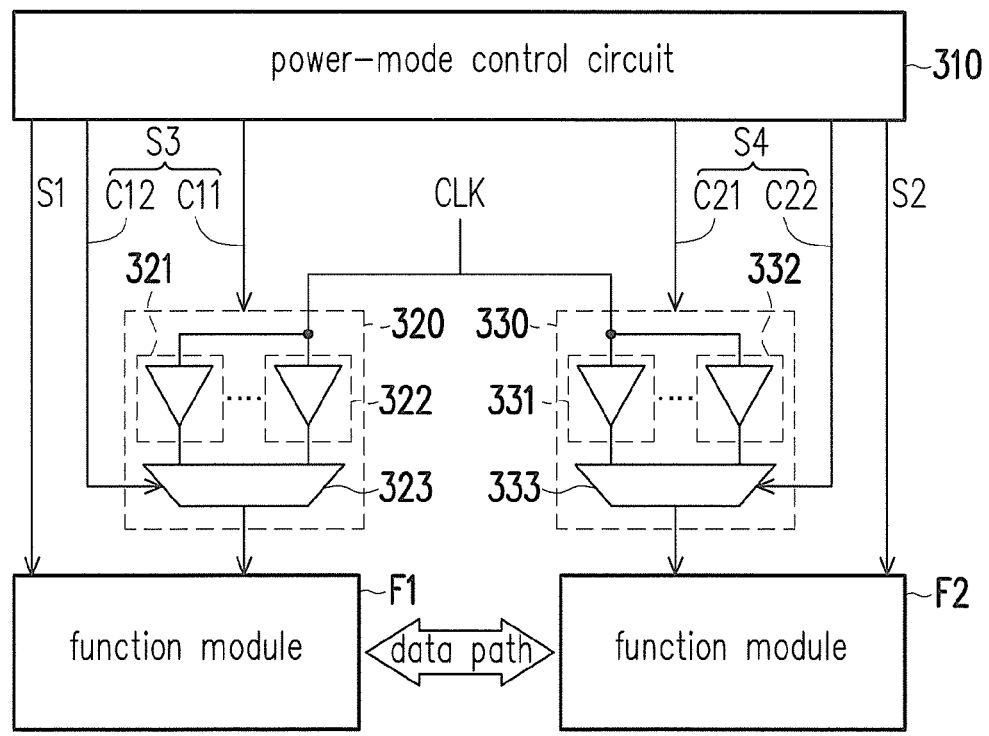
FIG. 4 is a schematic diagram illustrating circuitry of the PMA buffers in FIG. 3 according to another exemplary example of the disclosure.

FIG. 4 is a schematic diagram illustrating circuitry of the PMA buffers 320 and 330 in FIG. 3 according to another exemplary example of the disclosure. In the present embodiment, the power information S3 includes a selection signal C12 and a control voltage C11, and the power information S4 includes a selection signal C22 and a control voltage C21. The first channel PMA buffer 320 includes a first PMA buffer formed by a plurality of delayed-channels (e.g., 321 and 322 depicted in FIG. 4) and a switching unit 323, and the second channel PMA buffer 330 includes a second PMA buffer formed by a plurality of delayed-channels (e.g., 331 and 332 depicted in FIG. 4) and a switching unit 333. The switching units 323 and 333 may be switches, multiplexers or other selection circuits.

An input terminal of the first PMA buffer (i.e., input terminals of the delayed-channels 321 and 322) receives the system clock CLK. The switching unit 323 of the first PMA buffer is controlled by the selection signal C12 to select a selected delayed-channel from among the delayed-channels. The switching unit 323 selects to electrically connect an output terminal of one of the delayed-channels 321 and 322 to the first sub clock tree in the first function module F1 according to the selection signal C12. A selected delayed-channel of the first channel PMA buffer 320 is controlled by the control voltage C11 to delay the system clock CLK for a first delay time to serve as a first delayed clock, and provide the first delayed clock to a clock input terminal of the first sub clock tree in the first function module F1 through the switching unit 323. Delay times of the delayed-channels 321 and 322 are controlled by the control voltage C11.

An input terminal of the second PMA buffer (i.e., input terminals of the delayed-channels 331 and 332) receives the system clock CLK. The switching unit 333 of the second PMA buffer is controlled by the selection signal C22 to select a selected delayed-channel from among the delayed-channels. The switching unit 333 selects to electrically connect an output terminal of one of the delayed-channels 331 and 332 to the second sub clock tree in the second function module F2 according to the selection signal C22. A selected delayed-channel of the second channel PMA buffer 330 is controlled by the control voltage C21 to delay the system clock CLK for a second delay time to serve as a second delayed clock, and provide the second delayed clock to a clock input terminal of the second sub clock tree in the second function module F2 through the switching unit 333. Delay times of the delayed-channels 331 and 332 are controlled by the control voltage C21.

Figure 5:
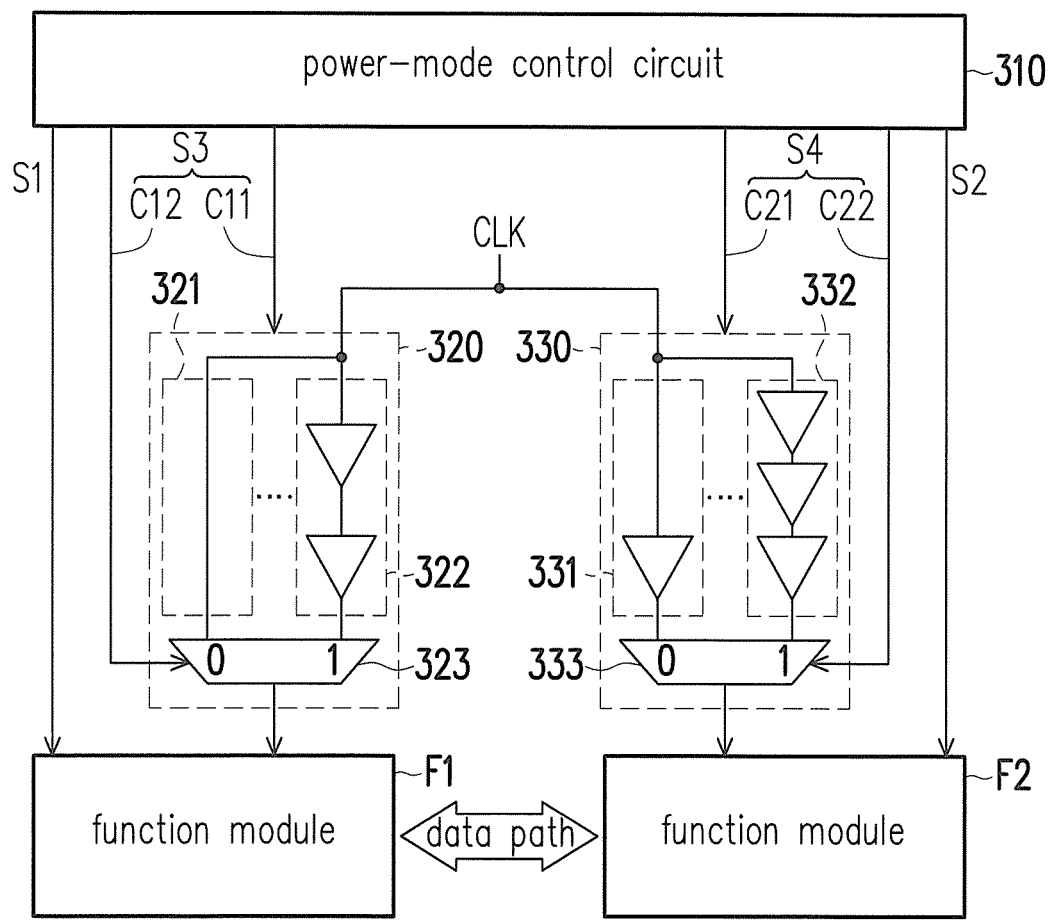
FIG. 5 is a schematic diagram illustrating circuitry of the PMA buffers in FIG. 4 according to an exemplary example of the disclosure.

FIG. 5 is a schematic diagram illustrating circuitry of the PMA buffers 320 and 330 in FIG. 4 according to an exemplary example of the disclosure. Referring to FIG. 5, in the present embodiment, the delayed-channel 321 is disposed with 0 clock buffer, the delayed-channel 322 is disposed with 2 clock buffers, the delayed-channel 331 is disposed with 1 clock buffer, and the delayed-channel 332 is disposed with 3 clock buffers. Herein, it is assumed that in the delayed-channels 321, 322, 331 and 332, a clock delay of the clock buffer used therein is 0.04 ns under the power voltage of 1.0V, and the clock delay of the clock buffer is 2.38 ns under the power voltage of 0.4V. And, it is assumed that in the switching units 323 and 333, a clock delay is 0.12 ns under the power voltage of 1.0V, and the clock delay is 2.50 ns under the power voltage of 0.4V. It is also assumed that, the clock latencies of the function modules F1 and F2 under the power voltage of 1.0V are respectively 0.28 ns and 0.23 ns, and the clock latencies of the function modules F1 and F2 under the power voltage of 0.4V are respectively 9.37 ns and 7.00 ns. Table 4 illustrates the clock skews for the function modules F1 and F2 depicted in FIG. 5 respectively under different power modes.

TABLE 4 the clock skews for the function modules F1 and F2 depicted in FIG. 5 respectively under different power modes are illustrated.

| Power Mode | Clock latency and power voltage of F1 | Clock delay and power voltage of the PMA buffer 320 | Selection signal C12 | Clock latency and power voltage of F2 | Clock delay and power voltage of the PMA buffer 330 | Selection signal C22 | Clock Skew |
|---|---|---|---|---|---|---|---|
| 1 | 0.28 ns (1.0 V) | 0.12 ns (1.0 V) | 0 | 0.23 ns (1.0 V) | 0.16 ns (1.0 V) | 0 | 0.01 ns |
| 2 | 0.28 ns (1.0 V) | 7.26 ns (0.4 V) | 1 | 7.00 ns (0.4 V) | 0.16 ns (1.0 V) | 0 | 0.38 ns |
| 3 | 9.37 ns (0.4 V) | 0.12 ns (1.0 V) | 0 | 0.23 ns (1.0 V) | 9.64 ns (0.4 V) | 1 | 0.38 ns |
| 4 | 9.37 ns (0.4 V) | 2.50 ns (0.4 V) | 0 | 7.00 ns (0.4 V) | 4.88 ns (0.4 V) | 0 | 0.01 ns |

In the power mode 1 of full speed (in which the power voltages of the function modules F1 and F2 are both 1.0V), the power-mode control circuit 310 controls the switching unit 323 for selecting to electrically connect the output terminal of the delayed-channel 321 to the first sub clock tree in the first function module F1 according to the selection signal C12 (which is logic 0 at the time), and the power-mode control circuit 310 controls the switching unit 333 for selecting to electrically connect the output terminal of the delayed-channel 331 to the second sub clock tree in the second function module F2 according to the selection signal C22 (which is logic 0 at the time). In this case, according to the control voltages C11 and C21, the power voltages of the delayed-channel 321, the switching unit 323, the delayed-channel 331 and the switching unit 333 are all 1.0V. Accordingly, the clock latency of the function module F1 is 0.00+0.12+0.28=0.40 ns, the clock latency of the function module F2 is 0.04+0.12+0.23=0.39 ns, and thus the clock skew is 0.40-0.39=0.01 ns.

When the power information S1 and S2 indicate that the power mode 2 is current operating, the function module F1 is operated at a maximum voltage (e.g., operated at 1.0V), and the function module F2 reduces the power voltage thereof (e.g., operated at 0.4V). In the power mode 2, the power-mode control circuit 310 controls the switching unit 323 for selecting to electrically connect the output terminal of the delayed-channel 322 to the first sub clock tree in the first function module F1 according to the selection signal C12 (which is logic 1 at the time), and the power-mode control circuit 310 controls the switching unit 333 for selecting to electrically connect the output terminal of the delayed-channel 331 to the second sub clock tree in the second function module F2 according to the selection signal C22 (which is logic 0 at the time). In this case, according to the control voltages C11 and C21, the power voltages of the delayed-channel 322 and the switching unit 323 are both 0.4V, and the power voltages of the delayed-channel 331 and the switching unit 333 are both 1.0V. Accordingly, the clock latency of the function module F1 is (2.38*2)+2.50+0.28=7.54 ns, the clock latency of the function module F2 is 0.04+0.12+7.00=7.16 ns, and thus the clock skew is 7.54−7.16=0.38 ns.

When the power information S1 and S2 indicate that the power mode 3 is current operating, the function module F1 reduces the power voltage thereof (e.g., operated at 0.4V), and the function module F2 is operated at the maximum voltage (e.g., operated at 1.0V). In the power mode 3, the power-mode control circuit 310 controls the switching unit 323 for selecting to electrically connect the output terminal of the delayed-channel 321 to the first sub clock tree in the first function module F1 according to the selection signal C12 (which is logic 0 at the time), and the power-mode control circuit 310 controls the switching unit 333 for selecting to electrically connect the output terminal of the delayed-channel 332 to the second sub clock tree in the second function module F2 according to the selection signal C22 (which is logic 1 at the time). In this case, according to the control voltages C11 and C21, the power voltages of the delayed-channel 321 and the switching unit 323 are both 1.0V, and the power voltages of the delayed-channel 332 and the switching unit 333 are both 0.4V. Accordingly, the clock latency of the function module F1 is 0.00+0.12+9.37=9.49 ns, the clock latency of the function module F2 is (2.38*3)+2.50+0.23=9.87 ns, and thus the clock skew is 9.87−9.49=0.38 ns.

When the power information S1 and S2 indicate that the power mode 4 is current operating, the function module F1 and the function module F2 both reduce their power voltages (e.g., operated at 0.4V). In the power mode 4, the power-mode control circuit 310 controls the switching unit 323 for selecting to electrically connect the output terminal of the delayed-channel 321 to the first sub clock tree in the first function module F1 according to the selection signal C12 (which is logic 0 at the time), and the power-mode control circuit 310 controls the switching unit 333 for selecting to electrically connect the output terminal of the delayed-channel 331 to the second sub clock tree in the second function module F2 according to the selection signal C22 (which is logic 0 at the time). In this case, according to the control voltages C11 and C21, the power voltages of the delayed-channel 321, the switching unit 323, the delayed-channel 331 and the switching unit 333 are all 0.4V. Accordingly, the clock latency of the function module F1 is 0.00+2.50+9.37=11.87 ns, the clock latency of the function module F2 is 2.38+2.50+7.00=11.88 ns, and thus the clock skew is 11.88−11.87=0.01 ns.

Therefore, according to a switch operation of power modes between the function module F1 and the function module F2, the PMA buffers 320 and 330 are capable of dynamically and correspondingly compensating the difference of the clock latencies between the function module F1 and the function module F2, such that overall clock skew of the clock tree can still satisfy the design specification. In comparison with the PMA buffers 220 and 230 depicted in FIG. 2 that require use of the clock buffers with the total of 227+59+228=514, the PMA buffers 320 and 330 depicted in FIG. 5 require use of the clock buffers with a total of 2+1+3=6. As a result, the amount of clock buffer used are substantially reduced to save consumed power and chip area.

In view of above, under the different power modes, the PMA clock tree depicted in FIG. 2 provides power with fixed voltage to the PMA buffers 220 and 230, and the clock skew between the function modules F1 and F2 is reduced by the PMA buffers 220 and 230. In case a voltage difference between the function modules F1 and F2 is not great (e.g., the power voltages of the function modules F1 and F2 are 0.9V and 1.2 respectively, and the voltage different thereof is 0.3V), the PMA clock tree depicted in FIG. 2 is capable of effectively controlling the clock skews under the different power modes. However, in case the power voltage under certain power mode is reduced to an ultra-low voltage, the voltage difference between the function modules is quite great (e.g., the power voltages of the function modules F1 and F2 are 1.0V and 0.4 respectively, and the voltage different thereof is 0.6V), such that the clock skew between the function modules is even more notable. It is foreseeable that, when the different function modules in one chip are operated under the different power modes (including the ultra-low voltage), challenge from the clock latency and the clock skew which are increased by the clock tree is unavoidable.

Therefore, in comparison with the PMA clock tree depicted in FIG. 2, a control mechanism for adjusting the power voltages of the PMA buffers (e.g., the control voltages C11 and C21) and a selection mechanism for selecting the different delayed-channels in the PMA buffer (e.g., the selection signals C12 and C22) are further added in the PMA clock tree with voltage control as depicted in FIG. 5. By adjusting an operation voltage of each of the PMA buffer through the control voltages and selecting an appropriate delayed-channel for the clock through the selection signals, the PMA clock tree with voltage control depicted in FIG. 5 is capable of reducing the amount of clock buffers to be disposed in the PMA buffer while achieving design targets for the clock skew, chip area and power consumption. The PMA clock tree with voltage control depicted in FIG. 5 is capable of adjusting a clock output of each of the PMA buffers by utilizing the selection signals and the control voltages, so as to reduce the clock skew generated under the different power modes of the function modules.

Figure 6:
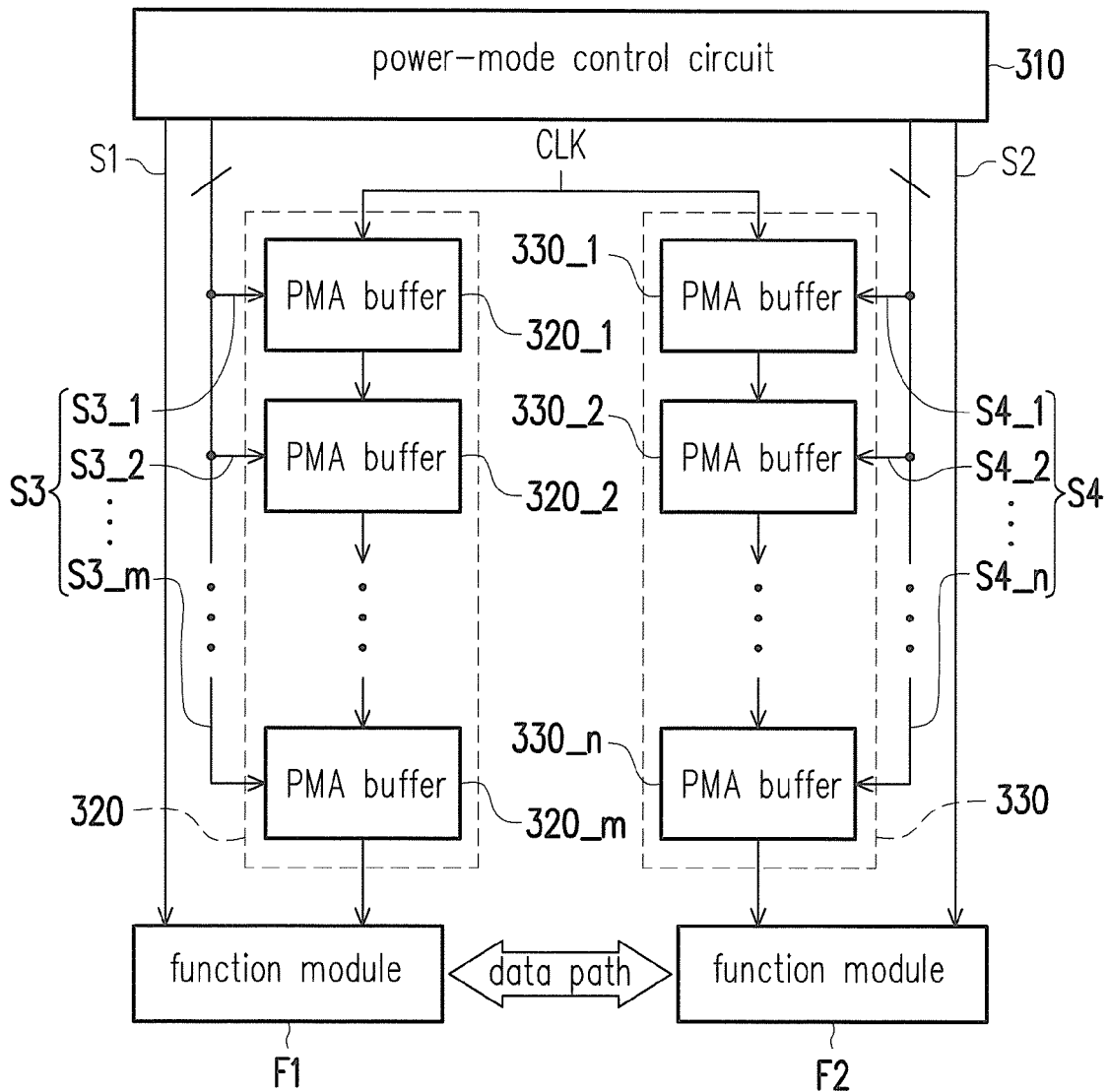
FIG. 6 is a block diagram illustrating circuitry of the first channel PMA buffer and the second channel PMA buffer in FIG. 3 according to yet another exemplary example of the disclosure.

An implementation for the clock tree depicted in FIG. 3 is not limited to the exemplary contents in FIG. 4 and FIG. 5. For instance, in another embodiment, FIG. 6 is a block diagram illustrating circuitry of the first channel PMA buffer 320 and the second channel PMA buffer 330 in FIG. 3 according to yet another exemplary example of the disclosure. In the embodiment depicted in FIG. 6, the first channel PMA buffer 320 includes a plurality of PMA buffers 320_1, 320_2, . . . , 320_m, and the second channel PMA buffer 330 includes a plurality of PMA buffers 330_1, 330_2, . . . , 330_n, wherein m and n are integers. The PMA buffers 320_1 to 320_m of the first channel PMA buffer 320 are connected in series between an input terminal of the first sub clock tree in the first function module F1 and the system clock CLK. The PMA buffers 330_1 to 330_n of the second channel PMA buffer 330 are connected in series between an input terminal of the second sub clock tree in the second function module F2 and the system clock CLK.

In the present embodiment, the power information S3 includes power information S3_1, S3_2, . . . , S3_m, and the power information S4 includes power information S4_1, S4_2, . . . , S4_n. The power-mode control circuit 310 provides the power information S3_1 to S3_m to the PMA buffers 320_1 to 320_m of the first channel PMA buffer 320 respectively, so as to determine the first delay time of the first channel PMA buffer 320. The power-mode control circuit 310 provides the power information S4_1 to S4_n to the PMA buffers 330_1 to 330_n of the second channel PMA buffer 330 respectively, so as to determine the second delay time of the second channel PMA buffer 330. In some embodiments, implementation detail of the PMA buffers 320_1 to 320_m and the PMA buffers 330_1 to 330_n depicted in FIG. 6 may be inferred by reference with related description of the PMA buffers 320 and 330 depicted in FIG. 4, and/or may be inferred by reference with related description of the PMA buffers 320 and 330 depicted in FIG. 5. Therefore, the PMA buffers 320_1 to 320_m and the PMA buffers 330_1 to 330_n are capable of dynamically and correspondingly compensating the difference of the clock latencies between the first function module F1 and the second function module F2 under the different power modes, such that overall clock skew of the clock tree can satisfy the design specification.

Figure 7:
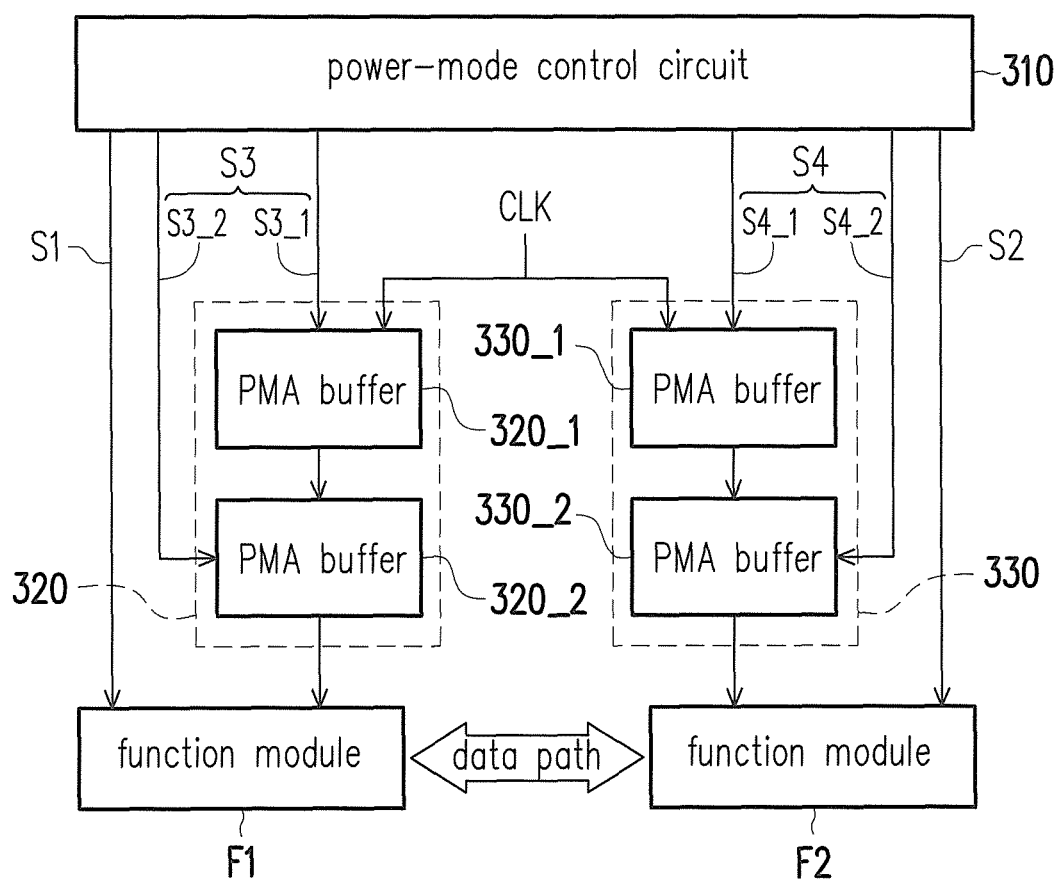
FIG. 7 is a block diagram illustrating circuitry of the first channel PMA buffer and the second channel PMA buffer in FIG. 6 according to an exemplary example of the disclosure.

FIG. 7 is a block diagram illustrating circuitry of the first channel PMA buffer 320 and the second channel PMA buffer 330 in FIG. 6 according to an exemplary example of the disclosure. In the embodiment depicted in FIG. 7, the first channel PMA buffer 320 includes a first PMA buffer 320_1 and a second PMA buffer 320_2, and the second channel PMA buffer 330 includes a third PMA buffer 330_1 and a fourth PMA buffer 330_2. The PMA buffers 320_1 and 320_2 are connected in series between an input terminal of the first sub clock tree in the first function module F1 and the system clock CLK. The PMA buffers 330_1 and 330_2 are connected in series between an input terminal of the second sub clock tree in the second function module F2 and the system clock CLK.

In the present embodiment, the power information S3_1 includes a first selection signal, and the power information S3_2 includes a second selection signal. A clock input terminal of the PMA buffer 320_1 receives the system clock CLK. The PMA buffer 320_1 is controlled by the first selection signal to select a first selected delayed-channel from among a plurality of first delayed-channels, and the first selected delayed-channel delays the system clock CLK to serve as a middle delayed clock. A clock input terminal of the PMA buffer 320_2 is coupled to an output terminal of the PMA buffer 320_1 for receiving the middle delayed clock. A clock output terminal of the PMA buffer 320_2 is coupled to an input terminal of the first sub clock tree in the first function module F1. The PMA buffer 320_2 is controlled by the second selection signal to select a second selected delayed-channel from among a plurality of second delayed-channels, and the second selected delayed-channel delays the middle delayed clock to serve as the first delayed clock required by the first function module F1.

The power voltages of the first delayed-channels of the PMA buffer 320_1 may be different from the power voltages of the second delayed-channels of the PMA buffer 320_2. For instance, in some embodiments, the power voltage of the PMA buffer 320_1 may be less than the power voltage of the PMA buffer 320_2 (e.g., the power voltage of the PMA buffer 320_1 may be fixed to 0.4V, and the power voltage of the PMA buffer 320_2 may be fixed to 1.0V). Accordingly, the power-mode control circuit 310 may control the delay time of the PMA buffer 320_1 through the power information S3_1, so as to roughly adjust the first delay time of the first channel PMA buffer 320; and the power-mode control circuit 310 may control the delay time of the PMA buffer 320_2 through the power information S3_2, so as to finely adjust the first delay time of the first channel PMA buffer 320. In some other embodiments, the power voltage of the PMA buffer 320_1 may be greater than the power voltage of the PMA buffer 320_2 (e.g., the power voltage of the PMA buffer 320_1 may be fixed to 1.0V, and the power voltage of the PMA buffer 320_2 may be fixed to 0.4V). Accordingly, the power-mode control circuit 310 may control the delay time of the PMA buffer 320_2 through the power information S3_2, so as to roughly adjust the first delay time of the first channel PMA buffer 320; and the power-mode control circuit 310 may control the delay time of the PMA buffer 320_1 through the power information S3_1 so as to finely adjust the first delay time of the first channel PMA buffer 320. As a result, the present embodiment is capable of reducing the amount of clock buffers in the PMA buffer while achieving design targets for the clock skew, chip area, power consumption, and internal/external chip synchronization.

Implementation detail of the power information S4_1, the power information S4_2, the second channel PMA buffer 330, the third PMA buffer 330_1 and the fourth PMA buffer 330_2 may be inferred by reference with related description of the power information S3_1, the power information S3_2, the first channel PMA buffer 320, the first PMA buffer 320_1 and the second PMA buffer 320_2, which is not repeated hereinafter. Therefore, the PMA buffers 320_1 and 320_2 and the PMA buffers 330_1 and 330_2 are capable of dynamically and correspondingly compensating the difference of the clock latencies between the first function module F1 and the second function module F2 under the different power modes, such that overall clock skew of the clock tree can satisfy the design specification.

Figure 8:
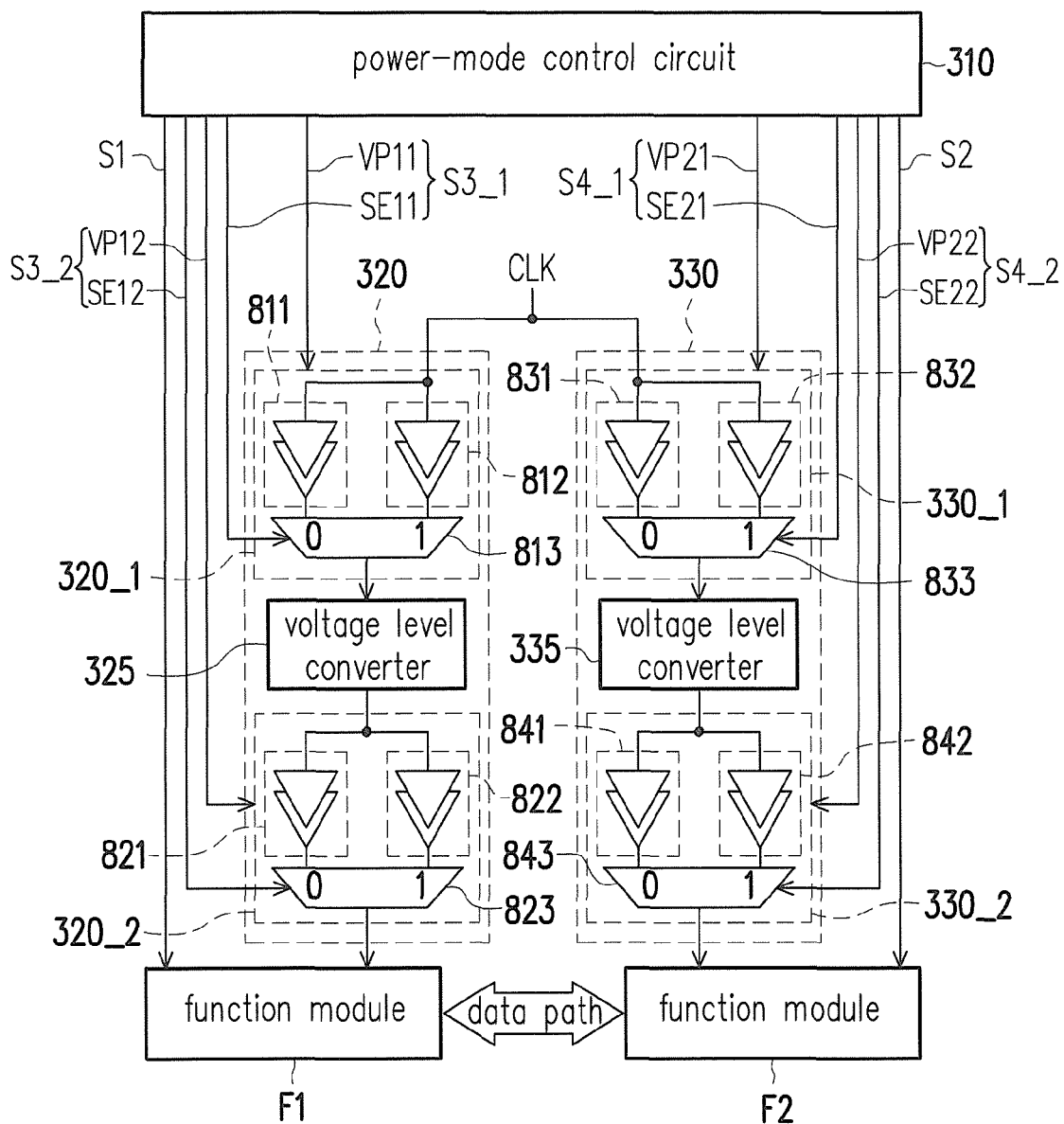
FIG. 8 is a block diagram illustrating circuitry of the first channel PMA buffer and the second channel PMA buffer in FIG. 6 according to another exemplary example of the disclosure.

FIG. 8 is a block diagram illustrating circuitry of the first channel PMA buffer 320 and the second channel PMA buffer 330 in FIG. 6 according to another exemplary example of the disclosure. In the embodiment depicted in FIG. 8, the first channel PMA buffer 320 includes a first PMA buffer 320_1, a voltage level converter 325 and a second PMA buffer 320_2, and the second channel PMA buffer 330 includes a third PMA buffer 330_1, a voltage level converter 335 and a fourth PMA buffer 330_2. The voltage level converter (or level shift circuit) 325 and the voltage level converter (or level shift circuit) 335 may be a voltage level converter of any type. The embodiment depicted in FIG. 8 may be inferred by reference with related description for FIG. 7.

In the present embodiment, the power information S3_1 includes a first selection signal SE11 and a first power voltage VP11, the power information S3_2 includes a second selection signal SE12 and a second power voltage VP12, the power information S4_1 includes a third selection signal SE21 and a third power voltage VP21, and the power information S4_2 includes a fourth selection signal SE22 and a fourth power voltage VP22. The first PMA buffer 320_1 includes a plurality of first delayed-channels (e.g., 811 and 812 depicted in FIG. 8) and a switching unit 813. The second PMA buffer 320_2 includes a plurality of second delayed-channels (e.g., 821 and 822 depicted in FIG. 8) and a switching unit 823. The third PMA buffer 330_1 includes a plurality of third delayed-channels (e.g., 831 and 832 depicted in FIG. 8) and a switching unit 833. The fourth PMA buffer 330_2 includes a plurality of fourth delayed-channels (e.g., 841 and 842 depicted in FIG. 8) and a switching unit 843. The switching units 813, 823, 833 and 843 may be switches, multiplexers or other selection circuits.

The power voltages VP11, VP12, VP21 and VP22 provide power to the PMA buffers 320_1, 320_2, 330_1 and 330_2, respectively. In the present embodiment, the power voltage VP11 of the first delayed-channels 811 and 812 is less than the power voltage VP12 of the second delayed-channels 821 and 822, and the power voltage VP21 of the third delayed-channels 831 and 832 is less than the power voltage VP22 of the fourth delayed-channels 841 and 842. For instance (but not limited thereto), the power voltage VP11 and the power voltage VP21 may be fixed to 0.4V, and the power voltage VP12 and the power voltage VP22 may be fixed to 1.0V. Accordingly, the power-mode control circuit 310 may increase the delay time of the PMA buffer 320_1 through the lower power voltage VP11, so as to roughly adjust the first delay time of the first channel PMA buffer 320; and the power-mode control circuit 310 may decrease the delay time of the PMA buffer 320_2 through the higher power voltage VP12, so as to finely adjust the first delay time of the first channel PMA buffer 320. The second delay time of the second channel PMA buffer 330 may also be inferred by reference with above method.

In some other embodiments, the power voltage VP11 of the first delayed-channels 811 and 812 may be greater than the power voltage VP12 of the second delayed-channels 821 and 822, and the power voltage VP21 of the third delayed-channels 831 and 832 may be greater than the power voltage VP22 of the fourth delayed-channels 841 and 842. For instance (but not limited thereto), the power voltage VP11 and the power voltage VP21 may be fixed to 1.0V, and the power voltage VP12 and the power voltage VP22 may be fixed to 0.4V. Accordingly, the power-mode control circuit 310 may decrease the delay time of the PMA buffer 320_1 through the higher power voltage VP11, so as to finely adjust the first delay time of the first channel PMA buffer 320; and the power-mode control circuit 310 may increase the delay time of the PMA buffer 320_2 through the lower power voltage VP12, so as to roughly adjust the first delay time of the first channel PMA buffer 320. The second delay time of the second channel PMA buffer 330 may also be inferred by reference with above method.

A clock input terminal of the PMA buffer 320_1 receives the system clock CLK. The PMA buffer 320_1 is controlled by the first selection signal SE11 to select a first selected delayed-channel from among the first delayed-channels 811 and 812, and the first selected delayed-channel delays the system clock CLK to serve as a first middle delayed clock. An input terminal of the voltage level converter 325 is coupled to a clock output terminal of the PMA buffer 320_1 to receive the first middle delayed clock (a low-voltage clock such as a 0.4V clock), and outputs a second middle delayed clock (a high-voltage clock such as a 1.0V clock). A clock input terminal of the PMA buffer 320_2 is coupled to an output terminal of the voltage level converter 325 for receiving the second middle delayed clock. A clock output terminal of the PMA buffer 320 is coupled to an input terminal of the first sub clock tree in the first function module F1. The PMA buffer 320_2 is controlled by the second selection signal SE12 to select a second selected delayed-channel from among the second delayed-channels 821 and 822, and the second selected delayed-channel delays the second middle delayed clock to serve as the first delayed clock required by the first function module F1.

In the present embodiment, the power voltage VP11 is less than the power voltage VP12. Accordingly, the power-mode control circuit 310 may control the delay time of the PMA buffer 320_1 through the selection signal SE11, so as to roughly adjust the first delay time of the first channel PMA buffer 320; and the power-mode control circuit 310 may control the delay time of the PMA buffer 320_2 through the selection signal SE12, so as to finely adjust the first delay time of the first channel PMA buffer 320. As a result, the present embodiment is capable of reducing the amount of clock buffers in the PMA buffer while achieving design targets for the clock skew, chip area, power consumption, and internal/external chip synchronization.

Implementation detail of the third PMA buffer 330_1, the voltage level converter 355 and the fourth PMA buffer 330_2 may be inferred by reference with related description of the first PMA buffer 320_1, the voltage level converter 325 and the second PMA buffer 320_2, which is not repeated hereinafter. Therefore, the PMA buffers 320_1 and 320_2 and the PMA buffers 330_1 and 330_2 are capable of dynamically and correspondingly compensating the difference of the clock latencies between the first function module F1 and the second function module F2 under the different power modes, such that overall clock skew of the clock tree can satisfy the design specification.

Figure 9:
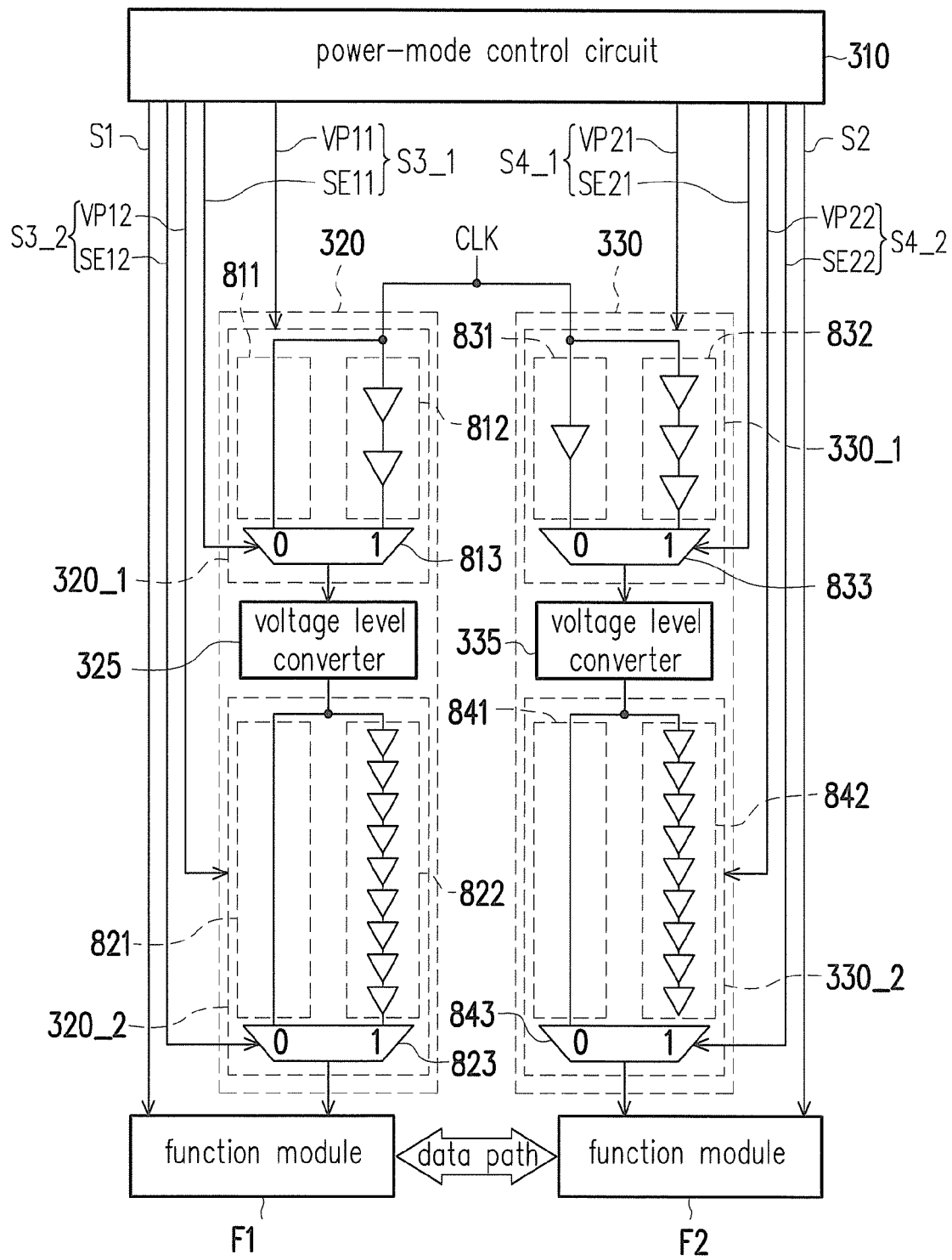
FIG. 9 is a block diagram illustrating circuitry of the first channel PMA buffer and the second channel PMA buffer in FIG. 8 according to still another exemplary example of the disclosure.

FIG. 9 is a block diagram illustrating circuitry of the first channel PMA buffer 320 and the second channel PMA buffer 330 in FIG. 8 according to still another exemplary example of the disclosure. In the embodiment depicted in FIG. 9, the first delayed-channel 811 includes 0 clock buffer, the first delayed-channel 812 includes 2 clock buffers, the second delayed-channel 821 includes 0 clock buffer, the second delayed-channel 822 includes 9 clock buffers, the third delayed-channel 831 includes 1 clock buffer, the third delayed-channel 832 includes 3 clock buffers, the fourth delayed-channel 841 includes 0 clock buffer, and the fourth delayed-channel 842 includes 9 clock buffers.

Herein, it is assumed that in the switching units 813, 823, 833 and 843, a delay time is 0.12 ns under the power voltage of 1.0V, and the delay time is 2.50 ns under the power voltage of 0.4V. It is assumed that in the delayed-channels 811, 812, 821, 822, 831, 832, 841 and 842, a delay time is 0.04 ns under the power voltage of 1.0V, and the delay time is 2.38 ns under the power voltage of 0.4V. In case a voltage level is converted from 0.4V to 1.0V, a delay time of the voltage level converters 325 and 335 is 0.2 ns. It is also assumed that, the clock latencies of the function modules F1 and F2 under the power voltage of 1.0V are respectively 0.28 ns and 0.23 ns, and the clock latencies of the function modules F1 and F2 under the power voltage of 0.4V are respectively 9.37 ns and 7.00 ns. In the power mode 1 (i.e., the power voltages of the function modules F1 and F2 are both 1.0V), the power voltages VP11 and VP12 of the PMA buffers 320_1 and 320_2 and the power voltages VP21 and VP22 of the PMA buffers 330_1 and 330_2 are all maintained at 1.0V. In the power mode 2 (i.e., the power voltages of the function modules F1 and F2 are 1.0V and 0.4V respectively), the power voltage VP11 of the PMA buffer 320_1 is 0.4V, and the power voltage VP12 of the PMA buffer 320_2, the power voltages VP21 and VP22 of the PMA buffers 330_1 and 330_2 are all maintained at 1.0V. In the power mode 3 (i.e., the power voltages of the function modules F1 and F2 are 0.4V and 1.0V respectively), the power voltage VP21 of the PMA buffer 330_1 is 0.4V, and the power voltages VP11 and VP12 of the PMA buffers 320_1 and 320_2, and the power voltage VP22 of the PMA buffer 330_2 are all maintained at 1.0V. In the power mode 4 (i.e., the power voltages of the function modules F1 and F2 are both 0.4V), the power voltages VP11 and VP21 of the PMA buffers 320_1 and 330_1 are both maintained at 0.4V, and the power voltages VP12 and VP22 of the PMA buffers 320_2 and 330_2 are both maintained at 1.0V. Table 5 illustrates the clock latencies of the first function module F1 under different power modes. Table 6 illustrates the clock latencies of the second function module F2 under different power modes. Table 7 illustrates the clock skews for the function modules F1 and F2 depicted in FIG. 9 respectively under different power modes.

TABLE 5 the clock latencies of the function module F1 depicted in FIG. 9 under different power modes are illustrated.

| Power Mode | Power Voltage of F1 | Clock delay in F1 | Clock delay of the PMA buffer 320 | Power Information | | | | Clock latency to F1 |
|---|---|---|---|---|---|---|---|---|
| | | | | SE11 | VP11 | SE12 | VP12 | |
| 1 | 1.0 V | 0.28 ns | 0.44 ns | 0 | 1.0 V | 0 | 1.0 V | 0.72 ns |
| 2 | 1.0 V | 0.28 ns | 7.58 ns | 1 | 0.4 V | 0 | 1.0 V | 7.86 ns |
| 3 | 0.4 V | 9.37 ns | 0.80 ns | 0 | 1.0 V | 1 | 1.0 V | 10.17 ns |
| 4 | 0.4 V | 9.37 ns | 2.82 ns | 0 | 0.4 V | 0 | 1.0 V | 12.19 ns |

TABLE 6 the clock latencies of the function module F2 depicted in FIG. 9 under different power modes are illustrated.

| Power Mode | Power Voltage of F2 | Clock delay in F2 | Clock delay of the PMA buffer 330 | Power Information | | | | Clock latency to F2 |
|---|---|---|---|---|---|---|---|---|
| | | | | SE21 | VP21 | SE22 | VP22 | |
| 1 | 1.0 V | 0.23 ns | 0.48 ns | 0 | 1.0 V | 0 | 1.0 V | 0.71 ns |
| 2 | 0.4 V | 7.00 ns | 0.84 ns | 0 | 1.0 V | 1 | 1.0 V | 7.84 ns |
| 3 | 1.0 V | 0.23 ns | 9.96 ns | 1 | 0.4 V | 0 | 1.0 V | 10.19 ns |
| 4 | 0.4 V | 7.00 ns | 5.20 ns | 0 | 0.4 V | 0 | 1.0 V | 12.20 ns |

TABLE 7 the clock skews for the function modules F1 and F2 depicted in FIG. 9 under different power modes are illustrated.

| Power Mode | Power Voltage of F1 | Clock latency to F1 | Power Voltage of F2 | Clock latency to F2 | Clock Skew |
|---|---|---|---|---|---|
| 1 | 1.0 V | 0.72 ns | 1.0 V | 0.71 ns | 0.01 ns |
| 2 | 1.0 V | 7.86 ns | 0.4 V | 7.84 ns | 0.02 ns |
| 3 | 0.4 V | 10.17 ns | 1.0 V | 10.19 ns | 0.02 ns |
| 4 | 0.4 V | 12.19 ns | 0.4 V | 12.20 ns | 0.01 ns |

In the power mode 1 of full speed (in which the power voltages of the function modules F1 and F2 are both 1.0V), the power-mode control circuit 310 controls the switching unit 813 to select the delayed-channel 811 according to the selection signal SE11 (which is logic 0 at the time), controls the switching unit 823 to select the delayed-channel 821 according to the selection signal SE12 (which is logic 0 at the time), controls the switching unit 833 to select the delayed-channel 831 according to the selection signal SE21 (which is logic 0 at the time), and controls the switching unit 843 to select the delayed-channel 841 according to the selection signal SE22 (which is logic 0 at the time). In this case, the clock latency of the first function module F1 is 0.12+0.2+0.12+0.28=0.72 ns, the clock latency of the second function module F2 is 0.04+0.12+0.2+0.12+0.23=0.71 ns, and thus the clock skew between the first function module F1 and the second function module F2 under the power mode 1 is 0.72−0.71=0.01 ns.

When the power information S1 and S2 indicate that the power mode 2 is current operating, the power voltage of the function module F1 is 1.0V, and the function module F2 reduces the power voltage thereof (e.g., to 0.4V). In the power mode 2, the power-mode control circuit 310 controls the switching unit 813 to select the delayed-channel 812 according to the selection signal SE11 (which is logic 1 at the time), controls the switching unit 823 to select the delayed-channel 821 according to the selection signal SE12 (which is logic 0 at the time), controls the switching unit 833 to select the delayed-channel 831 according to the selection signal SE21 (which is logic 0 at the time), and controls the switching unit 843 to select the delayed-channel 842 according to the selection signal SE22 (which is logic 1 at the time). In this case, the power voltage VP11 of the PMA buffer 320_1 is 0.4V, and the power voltage VP12 of the PMA buffer 320_2, the power voltages VP21 of the PMA buffer 330_1 and the power voltages VP22 of the PMA buffer 330_2 are all maintained at 1.0V. Therefore, the clock latency of the first function module F1 is 2*2.38+2.5+0.2+ 0.12+0.28=7.86 ns, the clock latency of the second function module F2 is 0.04+0.12+0.2+9*0.04+0.12+7=7.84 ns, and thus the clock skew between the first function module F1 and the second function module F2 under the power mode 2 is 7.86-7.84=0.02 ns.

When the power information S1 and S2 indicate that the power mode 3 is current operating, the function module F1 reduces the power voltage thereof (e.g., to 0.4V), and the power voltage of the function module F2 is 1.0V. In the power mode 3, the power-mode control circuit 310 controls the switching unit 813 to select the delayed-channel 811 according to the selection signal SE11 (which is logic 0 at the time), controls the switching unit 823 to select the delayed-channel 822 according to the selection signal SE12 (which is logic 1 at the time), controls the switching unit 833 to select the delayed-channel 832 according to the selection signal SE21 (which is logic 1 at the time), and controls the switching unit 843 to select the delayed-channel 841 according to the selection signal SE22 (which is logic 0 at the time). In this case, the power voltage VP21 of the PMA buffer 330_1 is 0.4V, and the power voltage VP11 of the PMA buffer 320_1, the power voltages VP12 of the PMA buffer 320_2 and the power voltages VP22 of the PMA buffer 330_2 are all maintained at 1.0V. Therefore, the clock latency of the first function module F1 is 0.12+0.2+9*0.04+ 0.12+9.37=10.17 ns, the clock latency of the second function module F2 is 3*2.38+2.5+0.2+0.12+0.23=10.19 ns, and thus the clock skew between the first function module F1 and the second function module F2 under the power mode 3 is 110.17−10.191=0.02 ns.

When the power information S1 and S2 indicate that the power mode 4 is current operating, the function module F1 and the function module F2 both reduce their power voltages (e.g., to 0.4V). In the power mode 4, the power-mode control circuit 310 controls the switching unit 813 to select the delayed-channel 811 according to the selection signal SE11 (which is logic 0 at the time), controls the switching unit 823 to select the delayed-channel 821 according to the selection signal SE12 (which is logic 0 at the time), controls the switching unit 833 to select the delayed-channel 831 according to the selection signal SE21 (which is logic 0 at the time), and controls the switching unit 843 to select the delayed-channel 841 according to the selection signal SE22 (which is logic 0 at the time). In this case, the power voltage VP11 of the PMA buffer 320_1 and the power voltage VP21 of the PMA buffer 330_1 are both maintained at 0.4V, and the power voltage VP12 of the PMA buffer 320_2 and the power voltage VP22 of the PMA buffer 330_2 are both maintained at 1.0V. Therefore, the clock latency of the first function module F1 is 2.5+0.2+0.12+9.37=12.19 ns, the clock latency of the second function module F2 is 2.38+ 2.5+0.2+0.12+7=12.20 ns, and thus the clock skew between the first function module F1 and the second function module F2 under the power mode 4 is 112.19−12.201=0.01 ns.

Therefore, according to a switch operation of power modes between the first function module F1 and the second function module F2, the first channel PMA buffer 320 and the second channel PMA buffer 330 are capable of dynamically and correspondingly compensating the difference of the clock latencies between the first function module F1 and the second function module F2, such that overall clock skew of the clock tree can still satisfy the design specification. In case the embodiment depicted in FIG. 9 does not include the first channel PMA buffer 320 and the second channel PMA buffer 330, the original clock skew between the first function module F1 and the second function module F2 may reach up to 9.14 ns (i.e., 9.31−0.23=9.14 ns). The first channel PMA buffer 320 and the second channel PMA buffer 330 are capable of reducing the original clock skew between the first function module F1 and the second function module F2 from 9.14 ns to 0.02 ns. In comparison with the PMA buffers 220 and 230 depicted in FIG. 2 that require use of the clock buffers with the total of 227+59+228=514, the PMA buffers 320 and 330 depicted in FIG. 9 require use of the clock buffers with a total of 2+9+1+3+9=24. As a result, the amount of clock buffer used are substantially reduced to save consumed power and chip area.

Figure 10:
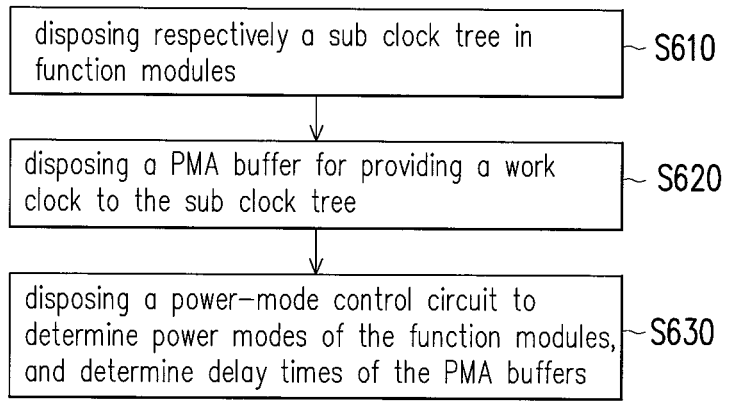
FIG. 10 is a flowchart illustrating a synthesis method of a clock tree in an integrated circuit according to an embodiment of the disclosure.

FIG. 10 is a flowchart illustrating a synthesis method of a clock tree in an integrated circuit according to an embodiment of the disclosure. The synthesis method includes: disposing a first sub clock tree in a first function module of the integrated circuit (step S610) to transfer a first delayed clock to different components in the first function module; disposing a second sub clock tree in a second function module of the integrated circuit (step S610) to transfer a second delayed clock to different components (e.g., registers inside the function module and/or other components under control of the delayed clock) in the second function module; disposing at least one first channel PMA buffer (step S620) to delay a system clock CLK for a first delay time to serve as the first delayed clock for providing to the first sub clock tree, wherein the at least one first channel PMA buffer is connected in series between an input terminal of the first sub clock tree and the system clock CLK; disposing at least one second channel PMA buffer (step S620) to delay the system clock CLK for a second delay time to serve as the second delayed clock for providing to the second sub clock tree, wherein the at least one second channel PMA buffer is connected in series between an input terminal of the second sub clock tree and the system clock CLK; and disposing a power-mode control circuit (step S630). Therein, the power-mode control circuit is configured to determine power modes of the first function module and the second function module through at least two first power information, and the power-mode control circuit is configured to provide at least two second power information to the at least one first channel PMA buffer and the at least one second channel PMA buffer to determine the first delay time and the second delay time. Therein, the at least two first power information are independent from the at least two second power information.

In some embodiments, the at least two first power information may include a first power-mode control signal and a second power-mode control signal. The first function module F1 determines the power voltage of the first function module F1 according to the first power-mode control signal, and the second function module F2 determines the power voltage of the second function module F2 according to the second power-mode control signal.

In some other embodiments, the at least two first power information include a first power voltage and a second power voltage. The first power voltage provides the operation power required by the first function module F1, and the second power voltage provides an operation power required by the second function module F2.

In yet some other embodiments, the at least one first channel PMA buffer includes a first PMA buffer coupled to the first sub clock tree, and the at least one second channel PMA buffer includes a second PMA buffer coupled to the second sub clock tree. The synthesis method further includes: when the at least two first power information indicate that a power voltage of the first function module F1 is greater than a power voltage of the second function module F2, controlling the first PMA buffer and the second PMA buffer through the at least two second power information to make the power voltage of the first PMA buffer less than the power voltage of the second PMA buffer; and when the at least two first power information indicate that the power voltage of the first function module F1 is less than the power voltage of the second function module F2, controlling the first PMA buffer and the second PMA buffer through the at least two second power information to make the power voltage of the first PMA buffer greater than the power voltage of the second PMA buffer.

In some other embodiments, the at least two second power information include a first selection signal and a second selection signal. The step of disposing the at least one first channel PMA buffer in the synthesis method includes: disposing a first PMA buffer to receive the system clock CLK, wherein the first PMA buffer is controlled by the first selection signal to select a first selected delayed-channel from among a plurality of first delayed-channels, and the first selected delayed-channel delays the system clock CLK to serve as a middle delayed clock; and disposing a second PMA buffer to receive the middle delayed clock, wherein a clock output terminal of the second PMA buffer is coupled to an input terminal of the first sub clock tree, the second PMA buffer is controlled by the second selection signal to select a second selected delayed-channel from among a plurality of second delayed-channels, and delaying the middle delayed clock by the second selected delayed-channel to serve as the first delayed clock. Therein, the power voltages of the first delayed-channels are different from the power voltages of the second delayed-channels.

In yet some other embodiments, the at least two second power information include a first selection signal and a second selection signal. The step of disposing the at least one first channel PMA buffer includes: disposing a first PMA buffer to receive the system clock CLK, wherein the first PMA buffer is controlled by the first selection signal to select a first selected delayed-channel from among a plurality of first delayed-channels, and delaying the system clock CLK by the first selected delayed-channel to serve as a first middle delayed clock; disposing a voltage level converter to receive the first middle delayed clock and output a second middle delayed clock; and disposing a second PMA buffer to receive the second middle delayed clock, wherein a clock output terminal of the second PMA buffer is coupled to an input terminal of the first sub clock tree, the second PMA buffer is controlled by the second selection signal to select a second selected delayed-channel from among a plurality of second delayed-channels, and delaying the second middle delayed clock by the second selected delayed-channel to serve as the first delayed clock. Therein, the power voltages of the first delayed-channels are different from the power voltages of the second delayed-channels.

Figure 11:
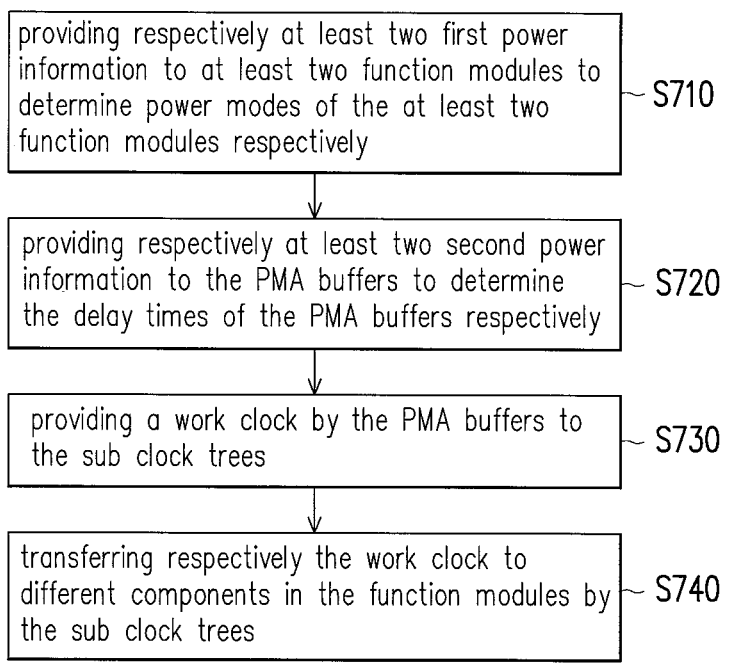
FIG. 11 is a flowchart illustrating an operation method of a clock tree in an integrated circuit according to an embodiment of the disclosure.

FIG. 11 is a flowchart illustrating an operation method of a clock tree in an integrated circuit according to an embodiment of the disclosure. Therein, the clock tree includes at least one first channel PMA buffer, at least one second channel PMA buffer, a first sub clock tree disposed in a first function module F1 of the integrated circuit and a second sub clock tree disposed in a second function module F2 of the integrated circuit. The operation method includes: providing respectively at least two first power information to the first function module F1 and the second function module F2 to determine power modes of the first function module F1 and the second function module F2 respectively (step S710); and providing respectively at least two second power information to the at least one first channel PMA buffer and the at least one second channel PMA buffer to determine the first delay time of the at least one first channel PMA buffer and the second delay time of the at least one second channel PMA buffer respectively (step S720), wherein the at least two first power information are independent from the at least two second power information; delaying a system clock CLK for a first delay time by the at least one first channel PMA buffer to serve as the first delayed clock for providing to the first sub clock tree (step S730), wherein the at least one first channel PMA buffer is connected in series between an input terminal of the first sub clock tree and the system clock CLK; delaying the system clock CLK for a second delay time by the at least one second channel PMA buffer to serve as the second delayed clock for providing to the second sub clock tree in the second function module F2 (step S730), wherein the at least one second channel PMA buffer is connected in series between an input terminal of the second sub clock tree and the system clock CLK; and transferring a first delayed clock to different components in the first function module F1 by the first sub clock tree (step S740); transferring a second delayed clock to different components in the second function module F2 by the second sub clock tree (step S740).

In some embodiments, the at least two first power information includes a first power-mode control signal and a second power-mode control signal. The operation method includes: determining a power voltage of the first function module F1 according to the first power-mode control signal;

and determining a power voltage of the second function module F2 according to the second power-mode control signal.

In some other embodiments, the at least two first power information include a first power voltage and a second power voltage. The operation method includes: providing the first power voltage to the first function module F1 to provide an operation power required by the first function module F1, and providing the second power voltage to the second function module F2 to provide an operation power required by the second function module F2.

In yet some other embodiments, the at least one first channel PMA buffer includes a first PMA buffer coupled to the first sub clock tree in the first function module F1, and the at least one second channel PMA buffer includes a second PMA buffer coupled to the second sub clock tree in the second function module F2. The operation method further includes: when the at least two first power information indicate that a power voltage of the first function module F1 is greater than a power voltage of the second function module F2, the power-mode control circuit controls the first PMA buffer and the second PMA buffer through the at least two second power information to make the power voltage of the first PMA buffer less than the power voltage of the second PMA buffer; and when the at least two first power information indicate that the power voltage of the first function module F1 is less than the power voltage of the second function module F2, controlling the first PMA buffer and the second PMA buffer through the at least two second power information to make the power voltage of the first PMA buffer greater than the power voltage of the second PMA buffer.

In some other embodiments, the at least two second power information include a first selection signal and a second selection signal. The step of delaying the system clock CLK by the first channel PMA buffer to serve as the first delayed clock in the operation method includes: selecting a first selected delayed-channel from among a plurality of first delayed-channels by the first PMA buffer according to the first selection signal; delaying the system clock by the first selected delayed-channel to serve as a middle delayed clock; selecting a second selected delayed-channel from among a plurality of second delayed-channels by the second PMA buffer according to the second selection signal; and delaying the middle delayed clock by the second selected delayed-channel to serve as the first delayed clock. Therein, the power voltages of the first delayed-channels are different from the power voltages of the second delayed-channels.

In yet some other embodiments, the at least two second power information include a first selection signal and a second selection signal, and the step of delaying the system clock by the first channel PMA buffer to serve as the first delayed clock includes: selecting a first selected delayed-channel from among a plurality of first delayed-channels by the first PMA buffer according to the first selection signal; delaying the system clock by the first selected delayed-channel to serve as a first middle delayed clock; converting the first middle delayed clock into a second middle delayed clock by a voltage level converter; selecting a second selected delayed-channel from among a plurality of second delayed-channels by the second PMA buffer according to the second selection signal; and delaying the second middle delayed clock by the second selected delayed-channel to serve as the first delayed clock. Therein, the power voltages of the first delayed-channels are different from the power voltages of the second delayed-channels.

Although the present disclosure has been described with reference to the above embodiments, it is apparent to one of the ordinary skill in the art that modifications to the described embodiments may be made without departing from the spirit of the present disclosure. Accordingly, the scope of the present disclosure will be defined by the attached claims not by the above detailed descriptions.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A clock tree in a circuit, comprising:
   a first sub clock tree, disposed in a first function module of the circuit to transfer a first delayed clock to different components in the first function module;
   a second sub clock tree, disposed in a second function module of the circuit to transfer a second delayed clock to different components in the second function module;
   at least one first channel power-mode-aware buffer connected in series between the first sub clock tree and a system clock to delay the system clock for a first delay time to serve as the first delayed clock for providing to the first sub clock tree;
   at least one second channel power-mode-aware buffer connected in series between the second sub clock tree and the system clock to delay the system clock for a second delay time to serve as the second delayed clock for providing to the second sub clock tree; and
   a power-mode control circuit, coupled to the at least one first channel power-mode-aware buffer, the at least one second channel power-mode-aware buffer, the first function module and the second function module, the power-mode control circuit determining power modes of the first function module and the second function module through at least two first power information, and the power-mode control circuit providing at least two second power information to the at least one first channel power-mode-aware buffer and the at least one second channel power-mode-aware buffer to determine the first delay time and the second delay time.

2. The clock tree in the circuit of claim 1, wherein the at least two first power information comprise a first power-mode control signal and a second power-mode control signal, the first function module determines a power voltage of the first function module according to the first power-mode control signal, and the second function module determines a power voltage of the second function module according to the second power-mode control signal.

3. The clock tree in the circuit of claim 1, wherein the at least two first power information comprise a first power voltage and a second power voltage, the first power voltage provides an operation power required by the first function module, and the second power voltage provides an operation power required by the second function module.

4. The clock tree in the circuit of claim 1, wherein the at least one first channel power-mode-aware buffer comprises a first power-mode-aware buffer coupled to the first sub clock tree, and the at least one second channel power-mode-aware buffer comprises a second power-mode-aware buffer coupled to the second sub clock tree; when the at least two first power information indicate that a power voltage of the first function module is greater than a power voltage of the second function module, the power-mode control circuit controls the first power-mode-aware buffer and the second power-mode-aware buffer through the at least two second power information to make a power voltage of the first power-mode-aware buffer less than a power voltage of the second power-mode-aware buffer; and when the at least two first power information indicate that the power voltage of the first function module is less than the power voltage of the second function module, the power-mode control circuit controls the first power-mode-aware buffer and the second power-mode-aware buffer through the at least two second power information to make the power voltage of the first power-mode-aware buffer greater than the power voltage of the second power-mode-aware buffer.

5. The clock tree in the circuit of claim 1, wherein the at least two second power information comprises a first control voltage and a second control voltage; the at least one first channel power-mode-aware buffer comprises a first power-mode-aware buffer; the at least one second channel power-mode-aware buffer comprises a second power-mode-aware buffer; an input terminal of the first power-mode-aware buffer receives the system clock, the first power-mode-aware buffer is controlled by the first control voltage to delay the system clock for the first delay time to serve as the first delayed clock, and an output terminal of the first power-mode-aware buffer is coupled to the first sub clock tree to provide the first delayed clock; and an input terminal of the second power-mode-aware buffer receives the system clock, the second power-mode-aware buffer is controlled by the second control voltage to delay the system clock for the second delay time to serve as the second delayed clock, and an output terminal of the second power-mode-aware buffer is coupled to the second sub clock tree to provide the second delayed clock.

6. The clock tree in the circuit of claim 1, wherein the at least two second power information comprises a first selection signal, a second selection signal, a first control voltage and a second control voltage; the at least one first channel power-mode-aware buffer comprises a first power-mode-aware buffer; the at least one second channel power-mode-aware buffer comprises a second power-mode-aware buffer; an input terminal of the first power-mode-aware buffer receives the system clock, the first power-mode-aware buffer is controlled by the first selection signal to select a first selected delayed-channel from among a plurality of first delayed-channels, the first selected delayed-channel is controlled by the first control voltage to delay the system clock for the first delay time to serve as the first delayed clock, and an output terminal of the first power-mode-aware buffer is coupled to the first sub clock tree to provide the first delayed clock; and an input terminal of the second power-mode-aware buffer receives the system clock, the second power-mode-aware buffer is controlled by the second selection signal to select a second selected delayed-channel from among a plurality of second delayed-channels, the second selected delayed-channel is controlled by the second control voltage to delay the system clock for the second delay time to serve as the second delayed clock, and an output terminal of the second power-mode-aware buffer is coupled to the second sub clock tree to provide the second delayed clock.

7. The clock tree in the circuit of claim 6, wherein the first power-mode-aware buffer comprises:
the first delayed-channels, having input terminals for receiving the system clock, wherein delay times of the first delayed-channels are controlled by the first control voltage; and
a switching unit, coupled between output terminals of the first delayed-channels and an input terminal of the first sub clock tree, wherein the switching unit selects to electrically connect the output terminal of one of the first delayed-channels to the input terminal of the first sub clock tree according to the first selection signal.

8. The clock tree in the circuit of claim 7, wherein the switching unit is a multiplexer.

9. The clock tree in the circuit of claim 1, wherein the at least two second power information comprise a first selection signal and a second selection signal, and the at least one first channel power-mode-aware buffer comprises:
a first power-mode-aware buffer, having a clock input terminal for receiving the system clock, wherein the first power-mode-aware buffer is controlled by the first selection signal to select a first selected delayed-channel from among a plurality of first delayed-channels, and the first selected delayed-channel delays the system clock to serve as a middle delayed clock; and
a second power-mode-aware buffer, having a clock input terminal coupled to an output terminal of the first power-mode-aware buffer for receiving the middle delayed clock, wherein a clock output terminal of the second power-mode-aware buffer is coupled to an input terminal of the first sub clock tree, the second power-mode-aware buffer is controlled by the second selection signal to select a second selected delayed-channel from among a plurality of second delayed-channels, and the second selected delayed-channel delays the middle delayed clock to serve as the first delayed clock.

10. The clock tree in the circuit of claim 1, wherein the at least two second power information comprise a first selection signal and a second selection signal, and the at least one first channel power-mode-aware buffer comprises:
a first power-mode-aware buffer, having a clock input terminal for receiving the system clock, wherein the first power-mode-aware buffer is controlled by the first selection signal to select a first selected delayed-channel from among a plurality of first delayed-channels, and the first selected delayed-channel delays the system clock to serve as a first middle delayed clock;
a voltage level converter, having an input terminal coupled to a clock output terminal of the first power-mode-aware buffer to receive the first middle delayed clock, and outputting a second middle delayed clock; and
a second power-mode-aware buffer, having a clock input terminal coupled to an output terminal of the voltage level converter for receiving the second middle delayed clock, wherein a clock output terminal of the second power-mode-aware buffer is coupled to an input terminal of the first sub clock tree, the second power-mode-aware buffer is controlled by the second selection signal to select a second selected delayed-channel from among a plurality of second delayed-channels, and the second selected delayed-channel delays the second middle delayed clock to serve as the first delayed clock.

11. An operation method of a clock tree in a circuit, wherein the clock tree comprises at least one first channel power-mode-aware buffer, at least one second channel power-mode-aware buffer, a first sub clock tree disposed in a first function module of the circuit and a second sub clock tree disposed in a second function module of the circuit, and the operating method comprises:
transferring a first delayed clock to different components in the first function module by the first sub clock tree;
transferring a second delayed clock to different components in the second function module by the second sub clock tree;

delaying a system clock for a first delay time by the at least one first channel power-mode-aware buffer to serve as the first delayed clock for providing to the first sub clock tree, wherein the at least one first channel power-mode-aware buffer is connected in series between an input terminal of the first sub clock tree and the system clock;

delaying the system clock for a second delay time by the at least one second channel power-mode-aware buffer to serve as the second delayed clock for providing to the second sub clock tree, wherein the at least one second channel power-mode-aware buffer is connected in series between an input terminal of the second sub clock tree and the system clock;

providing respectively at least two first power information to the first function module and the second function module to determine power modes of the first function module and the second function module respectively; and providing respectively at least two second power information to the at least one first channel power-mode-aware buffer and the at least one second channel power-mode-aware buffer to determine the first delay time and the second delay time respectively, wherein the at least two first power information are independent from the at least two second power information.

12. The operation method of the clock tree in the circuit of claim 11, wherein the at least two first power information comprise a first power-mode control signal and a second power-mode control signal, and the operation method comprises:

determining a power voltage of the first function module according to the first power-mode control signal; and determining a power voltage of the second function module according to the second power-mode control signal.

13. The operation method of the clock tree in the circuit of claim 11, wherein the at least two first power information comprise a first power voltage and a second power voltage, and the operating method comprises:

providing the first power voltage to the first function module to provide an operation power required by the first function module, and providing the second power voltage to the second function module to provide an operation power required by the second function module.

14. The operation method of the clock tree in the circuit of claim 11, wherein the at least one first channel power-mode-aware buffer comprises a first power-mode-aware buffer coupled to the first sub clock tree, the at least one second channel power-mode-aware buffer comprises a second power-mode-aware buffer coupled to the second sub clock tree, and the operation method further comprises:

controlling the first power-mode-aware buffer and the second power-mode-aware buffer through the at least two second power information to make a power voltage of the first power-mode-aware buffer less than a power voltage of the second power-mode-aware buffer when the at least two first power information indicate that a power voltage of the first function module is greater than a power voltage of the second function module; and controlling the first power-mode-aware buffer and the second power-mode-aware buffer through the at least two second power information to make the power voltage of the first power-mode-aware buffer greater than the power voltage of the second power-mode-aware buffer when the at least two first power information indicate that the power voltage of the first function module is less than the power voltage of the second function module.

15. The operation method of the clock tree in the circuit of claim 11, wherein the at least two second power information comprise a first selection signal and a second selection signal, and the step of delaying the system clock by the first channel power-mode-aware buffer to serve as the first delayed clock comprises:

selecting a first selected delayed-channel from among a plurality of first delayed-channels by a first power-mode-aware buffer according to the first selection signal;

delaying the system clock by the first selected delayed-channel to serve as a middle delayed clock;

selecting a second selected delayed-channel from among a plurality of second delayed-channels by a second power-mode-aware buffer according to the second selection signal; and delaying the middle delayed clock by the second selected delayed-channel to serve as the first delayed clock.

16. The operation method of the clock tree in the circuit of claim 11, wherein the at least two second power information comprise a first selection signal and a second selection signal, and the step of delaying the system clock by the first channel power-mode-aware buffer to serve as the first delayed clock comprises:

selecting a first selected delayed-channel from among a plurality of first delayed-channels by a first power-mode-aware buffer according to the first selection signal;

delaying the system clock by the first selected delayed-channel to serve as a first middle delayed clock;

converting the first middle delayed clock into a second middle delayed clock by a voltage level converter;

selecting a second selected delayed-channel from among a plurality of second delayed-channels by a second power-mode-aware buffer according to the second selection signal; and delaying the second middle delayed clock by the second selected delayed-channel to serve as the first delayed clock.

* * * * *